(12) United States Patent
Nicol

(10) Patent No.: US 10,659,396 B2
(45) Date of Patent: May 19, 2020

(54) JOINING DATA WITHIN A RECONFIGURABLE FABRIC

(71) Applicant: Wave Computing, Inc., Campbell, CA (US)

(72) Inventor: Christopher John Nicol, Campbell, CA (US)

(73) Assignee: Wave Computing, Inc., Santa Clara, CA (US)

( * ) Notice: Subject to any disclaimer, the term of this patent is extended or adjusted under 35 U.S.C. 154(b) by 0 days.

(21) Appl. No.: 16/021,840

(22) Filed: Jun. 28, 2018

(65) Prior Publication Data

US 2018/0324112 A1 Nov. 8, 2018

Related U.S. Application Data

(63) Continuation-in-part of application No. 15/904,724, filed on Feb. 26, 2018, and a continuation-in-part of
(Continued)

(51) Int. Cl.
*H04L 12/861* (2013.01)
*H04L 12/863* (2013.01)
(Continued)

(52) U.S. Cl.
CPC .......... *H04L 49/90* (2013.01); *H04L 47/2475* (2013.01); *H04L 47/39* (2013.01);
(Continued)

(58) Field of Classification Search
CPC .. G06F 9/50; G06N 3/04; H04L 49/90; H04L 49/1546
See application file for complete search history.

(56) References Cited

U.S. PATENT DOCUMENTS

| 5,142,631 A | 8/1992 | Murray et al. |
| 6,134,605 A | 10/2000 | Hudson et al. |

(Continued)

FOREIGN PATENT DOCUMENTS

| JP | 2005165961 A | 12/2003 |
| KR | 1020090028552 A | 3/2009 |
| WO | WO2009131569 A1 | 10/2009 |

OTHER PUBLICATIONS

International Search Report dated Feb. 6, 2015 for PCT/US2014/063591.

(Continued)

*Primary Examiner* — Edward J Dudek, Jr.
(74) *Attorney, Agent, or Firm* — Adams Intellex, PLC

(57) ABSTRACT

Techniques are disclosed for managing data within a reconfigurable computing environment. In a multiple processing element environment, such as a mesh network or other suitable topology, there is an inherent need to pass data between processing elements. Subtasks are divided among multiple processing elements. The output resulting from the subtasks is then merged by a downstream processing element. In such cases, a join operation can be used to combine data from multiple upstream processing elements. A control agent executes on each processing element. A memory buffer is disposed between upstream processing elements and the downstream processing element. The downstream processing element is configured to automatically perform an operation based on the availability of valid data from the upstream processing elements.

25 Claims, 11 Drawing Sheets

Related U.S. Application Data application No. 15/665,631, filed on Aug. 1, 2017, said application No. 15/904,724 is a continuation of application No. 15/226,472, filed on Aug. 2, 2016, now Pat. No. 10,374,981.

(60) Provisional application No. 62/679,172, filed on Jun. 1, 2018, provisional application No. 62/679,046, filed on Jun. 1, 2018, provisional application No. 62/650,758, filed on Mar. 30, 2018, provisional application No. 62/650,425, filed on Mar. 30, 2018, provisional application No. 62/637,614, filed on Mar. 2, 2018, provisional application No. 62/636,309, filed on Feb. 28, 2018, provisional application No. 62/611,600, filed on Dec. 29, 2017, provisional application No. 62/611,588, filed on Dec. 29, 2017, provisional application No. 62/594,563, filed on Dec. 5, 2017, provisional application No. 62/594,582, filed on Dec. 5, 2017, provisional application No. 62/579,616, filed on Oct. 31, 2017, provisional application No. 62/577,902, filed on Oct. 27, 2017, provisional application No. 62/547,769, filed on Aug. 19, 2017, provisional application No. 62/541,697, filed on Aug. 5, 2017, provisional application No. 62/539,613, filed on Aug. 1, 2017, provisional application No. 62/527,077, filed on Jun. 30, 2017, provisional application No. 62/486,204, filed on Apr. 17, 2017, provisional application No. 62/472,670, filed on Mar. 17, 2017, provisional application No. 62/464,119, filed on Feb. 27, 2017, provisional application No. 62/382,750, filed on Sep. 1, 2016, provisional application No. 62/200,069, filed on Aug. 2, 2015.

(51) Int. Cl.
*H04L 12/801* (2013.01)
*H04L 12/859* (2013.01)
*H04L 12/879* (2013.01)
*H04L 12/939* (2013.01)
*H04L 12/933* (2013.01)

(52) U.S. Cl.
CPC ...... *H04L 47/6225* (2013.01); *H04L 47/6235* (2013.01); *H04L 49/1546* (2013.01); *H04L 49/555* (2013.01); *H04L 49/557* (2013.01); *H04L 49/901* (2013.01); *H04L 49/9031* (2013.01); *G06F 2213/0064* (2013.01)

(56) References Cited

U.S. PATENT DOCUMENTS

| | | | |
|---|---|---|---|
| 6,363,470 | B1 | 3/2002 | Laurenti et al. |
| 7,817,655 | B1 | 10/2010 | Bennett et al. |
| 8,314,636 | B2 | 11/2012 | Hutton et al. |
| 8,341,469 | B2 | 12/2012 | Miyama et al. |
| 8,493,974 | B1 | 7/2013 | Nelson et al. |
| 2002/0166008 | A1* | 11/2002 | Tanaka ............ G06F 5/10 710/56 |
| 2002/0167337 | A1 | 11/2002 | Chelcea et al. |
| 2007/0101107 | A1* | 5/2007 | Isobe ............ G06F 15/7867 712/226 |
| 2007/0133399 | A1 | 6/2007 | Gangwal |
| 2008/0168303 | A1 | 7/2008 | Spear et al. |
| 2009/0083519 | A1* | 3/2009 | Yang ............ G06F 7/483 712/36 |
| 2009/0089605 | A1 | 4/2009 | Westwick et al. |
| 2009/0113405 | A1 | 4/2009 | De Sousa et al. |
| 2010/0013517 | A1 | 1/2010 | Manohar et al. |
| 2010/0017774 | A1 | 1/2010 | Bachina et al. |
| 2010/0281448 | A1 | 11/2010 | He |
| 2010/0332755 | A1* | 12/2010 | Bu ............ G06F 9/52 711/119 |
| 2011/0199117 | A1 | 8/2011 | Hutchings et al. |
| 2012/0089812 | A1 | 4/2012 | Smith |
| 2012/0119781 | A1 | 5/2012 | Manohar et al. |
| 2012/0235839 | A1 | 9/2012 | Mazumdar et al. |
| 2012/0319730 | A1 | 12/2012 | Fitton et al. |
| 2013/0009666 | A1 | 1/2013 | Hutton et al. |
| 2013/0009667 | A1 | 1/2013 | Calhoun et al. |
| 2013/0043902 | A1 | 2/2013 | Rahim et al. |
| 2014/0075144 | A1 | 3/2014 | Sanders et al. |
| 2014/0215476 | A1* | 7/2014 | Park ............ G06F 9/4881 718/102 |
| 2015/0268963 | A1 | 9/2015 | Etsion et al. |
| 2016/0085721 | A1* | 3/2016 | Abali ............ G06F 9/3001 712/15 |
| 2016/0124755 | A1* | 5/2016 | Balakrishnan ............ G06F 7/36 712/18 |
| 2016/0283428 | A1 | 9/2016 | Guddeti |
| 2016/0314025 | A1* | 10/2016 | McGarry ............ G06F 17/50 |
| 2017/0017610 | A1* | 1/2017 | Suh ............ G06F 1/3225 |
| 2017/0179958 | A1 | 6/2017 | Nicol |

OTHER PUBLICATIONS

International Search Report dated Nov. 21, 2018 for PCT/US2018/040009.

* cited by examiner

```
if (empty(FIFO0) || empty(FIFO1)) sleep()
if (full(FIFO2)) sleep()
if (sleep && (FIRE0 || FIRE1 || DONE3)) {
    awake()
}
if (FIRE0) head0++;
if (FIRE1) head1++;
if (DONE3) tail2++;
if (!empty(FIFO0) && !empty(FIFO1)
    && !full(FIFO2)) {
    read_input0; tail0++;
    send DONE2₀ (to Agent0)
    read_input1; tail1++;
    send DONE2₁ (to Agent1)
    process_input()
    write_output; head2++
    send FIRE2(to next Agent3)
}
```

FIG. 4

JOINING DATA WITHIN A RECONFIGURABLE FABRIC

RELATED APPLICATIONS

This application claims the benefit of U.S. provisional patent applications "Joining Data Within a Reconfigurable Fabric" Ser. No. 62/527,077, filed Jun. 30, 2017, "Remote Usage of Machine Learned Layers by a Second Machine Learning Construct" Ser. No. 62/539,613, filed Aug. 1, 2017, "Reconfigurable Fabric Operation Linkage" Ser. No. 62/541,697, filed Aug. 5, 2017, "Reconfigurable Fabric Data Routing" Ser. No. 62/547,769, filed Aug. 19, 2017, "Tensor Manipulation Within a Neural Network" Ser. No. 62/577,902, filed Oct. 27, 2017, "Tensor Radix Point Calculation in a Neural Network" Ser. No. 62/579,616, filed Oct. 31, 2017, "Pipelined Tensor Manipulation Within a Reconfigurable Fabric" Ser. No. 62/594,563, filed Dec. 5, 2017, "Tensor Manipulation Within a Reconfigurable Fabric Using Pointers" Ser. No. 62/594,582, filed Dec. 5, 2017, "Dynamic Reconfiguration With Partially Resident Agents" Ser. No. 62/611,588, filed Dec. 29, 2017, "Multithreaded Dataflow Processing Within a Reconfigurable Fabric" Ser. No. 62/611,600, filed Dec. 29, 2017, "Matrix Computation Within a Reconfigurable Processor Fabric" Ser. No. 62/636,309, filed Feb. 28, 2018, "Dynamic Reconfiguration Using Data Transfer Control" Ser. No. 62/637,614, filed Mar. 2, 2018, "Data Flow Graph Computation for Machine Learning" Ser. No. 62/650,758, filed Mar. 30, 2018, "Checkpointing Data Flow Graph Computation for Machine Learning" Ser. No. 62/650,425, filed Mar. 30, 2018, "Data Flow Graph Node Update for Machine Learning" Ser. No. 62/679,046, filed Jun. 1, 2018, and "Dataflow Graph Node Parallel Update for Machine Learning" Ser. No. 62/679,172, filed Jun. 1, 2018.

This application is also a continuation-in-part of U.S. patent application "Communication between Dataflow Processing Units and Memories" Ser. No. 15/665,631 filed Aug. 1, 2017, which claims the benefit of U.S. provisional patent application "Communication between Dataflow Processing Units and Memories" Ser. No. 62/382,750, filed Sep. 1, 2016.

This application is also a continuation-in-part of U.S. patent application "Data Flow Computation Using FIFOs" Ser. No. 15/904,724, filed Feb. 26, 2018, which claims the benefit of U.S. provisional patent applications "Data Flow Computation Using FIFOs" Ser. No. 62/464,119, filed Feb. 27, 2017, "Fork Transfer of Data Between Multiple Agents Within a Reconfigurable Fabric" Ser. No. 62/472,670, filed Mar. 17, 2017, "Reconfigurable Processor Fabric Implementation Using Satisfiability Analysis" Ser. No. 62/486,204, filed Apr. 17, 2017, "Joining Data Within a Reconfigurable Fabric" Ser. No. 62/527,077, filed Jun. 30, 2017, "Remote Usage of Machine Learned Layers by a Second Machine Learning Construct" Ser. No. 62/539,613, filed Aug. 1, 2017, "Reconfigurable Fabric Operation Linkage" Ser. No. 62/541,697, filed Aug. 5, 2017, "Reconfigurable Fabric Data Routing" Ser. No. 62/547,769, filed Aug. 19, 2017, "Tensor Manipulation Within a Neural Network" Ser. No. 62/577,902, filed Oct. 27, 2017, "Tensor Radix Point Calculation in a Neural Network" Ser. No. 62/579,616, filed Oct. 31, 2017, "Pipelined Tensor Manipulation Within a Reconfigurable Fabric" Ser. No. 62/594,563, filed Dec. 5, 2017, "Tensor Manipulation Within a Reconfigurable Fabric Using Pointers" Ser. No. 62/594,582, filed Dec. 5, 2017, "Dynamic Reconfiguration With Partially Resident Agents" Ser. No. 62/611,588, filed Dec. 29, 2017, and "Multithreaded Dataflow Processing Within a Reconfigurable Fabric" Ser. No. 62/611,600, filed Dec. 29, 2017.

The patent application "Data Flow Computation Using FIFOs" Ser. No. 15/904,724, filed Feb. 26, 2018 is also a continuation-in-part of U.S. patent application "Data Transfer Circuitry Given Multiple Source Elements" Ser. No. 15/226,472, filed Aug. 2, 2016, which claims the benefit of U.S. provisional patent application "Data Uploading to Asynchronous Circuitry Using Circular Buffer Control" Ser. No. 62/200,069, filed Aug. 2, 2015.

Each of the foregoing applications is hereby incorporated by reference in its entirety.

FIELD OF ART

This application relates generally to logic circuitry and more particularly to joining data within a reconfigurable fabric.

BACKGROUND

Single processor architectures are well-suited for some tasks, but are unable to provide the level of performance required by some high-performance systems. Parallel processing based on general-purpose processors can attain an increased level of performance. Thus, using systems with multiple processing elements is one approach for achieving increased performance. There is a wide variety of applications that demand a high level of performance. Such applications can include networking, image processing, simulations, and signal processing, to name a few. In addition to computing power, flexibility is also important for adapting to ever-changing business needs and technical situations.

Multiple core processor designs enable two or more cores to run simultaneously, with a combined throughput that can exceed the processing power of a single-core processor. In accordance with implications of Moore's Law, multiple core capacity allows for an increase in capability of electronic devices without hitting boundaries that would otherwise be encountered if attempting to implement similar processing power using a single core processor.

In multiple processing element systems, the processing elements communicate with each other, exchanging and combining data to produce intermediate and/or final outputs. Each processing element can have a variety of registers to support program execution and storage of intermediate data. Additionally, registers such as stack pointers, return addresses, and exception data can also be present to enable execution of complex routines and support debugging of computer programs running on the multiple processing elements. Furthermore, arithmetic units can provide mathematical functionality, such as addition, subtraction, multiplication, and division.

One architecture for use with multiple processing elements is a mesh network. A mesh network is a network topology containing multiple interconnected processing elements. The processing elements work together to distribute and process data. This architecture allows for a degree of parallelism for processing data, enabling increased performance. Additionally, the mesh network allows for a variety of component configurations.

Some applications demand reconfigurability. Reconfigurability is an important attribute in many processing applications, as reconfigurable devices are extremely efficient for certain types of processing tasks. In certain circumstances, the main reason that cost and performance advantages of reconfigurable devices exist is that reconfigurable logic enables program parallelism, allowing for multiple computation operations to occur simultaneously for the same program. Meanwhile, conventional processors are often limited by instruction bandwidth and execution restrictions. Typically, the high-density properties of reconfigurable devices come at the expense of the high-diversity property that is inherent in microprocessors. Microprocessors have evolved to a highly-optimized configuration that can provide cost/performance advantages over reconfigurable arrays for certain tasks with high functional diversity. However, there are many tasks for which a conventional microprocessor may not be the best design choice. An architecture supporting configurable interconnected processing elements can be a viable alternative in certain applications.

The emergence of reconfigurable computing has enabled a higher level of both flexibility and performance of computer systems. Reconfigurable computing combines the high speed of application-specific integrated circuits with the flexibility of programmable processors. This provides much-needed functionality and power to enable the technology used in many current and upcoming fields.

SUMMARY

A multiple processor environment such as a reconfigurable mesh utilizes multiple processing elements working in parallel to complete various tasks. Certain operations can be divided amongst multiple processing elements in a fan-out operation. The multiple processing elements each compute an intermediate portion of a result concurrently. The intermediate results are then merged using a join/merge operation by a downstream processing element. The join/merge operation can be initiated upon detection of valid data being present.

Embodiments include a processor-implemented method for data manipulation comprising: coupling a plurality of control agents, executing on a plurality of processing elements, wherein the plurality of processing elements comprises a reconfigurable fabric and wherein the plurality of processing elements is controlled by circular buffers; linking a first control agent and a second control agent, from the plurality of control agents, with a third control agent, from the plurality of control agents; and receiving data from the first control agent and the second control agent by the third control agent, wherein a first FIFO memory is employed by the first control agent to facilitate the receiving of the data by the third control agent, and a second FIFO memory is employed by the second control agent to facilitate the receiving of the data by the third control agent.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 4 illustrates pseudocode for agent operation.

DETAILED DESCRIPTION

Figure 1:
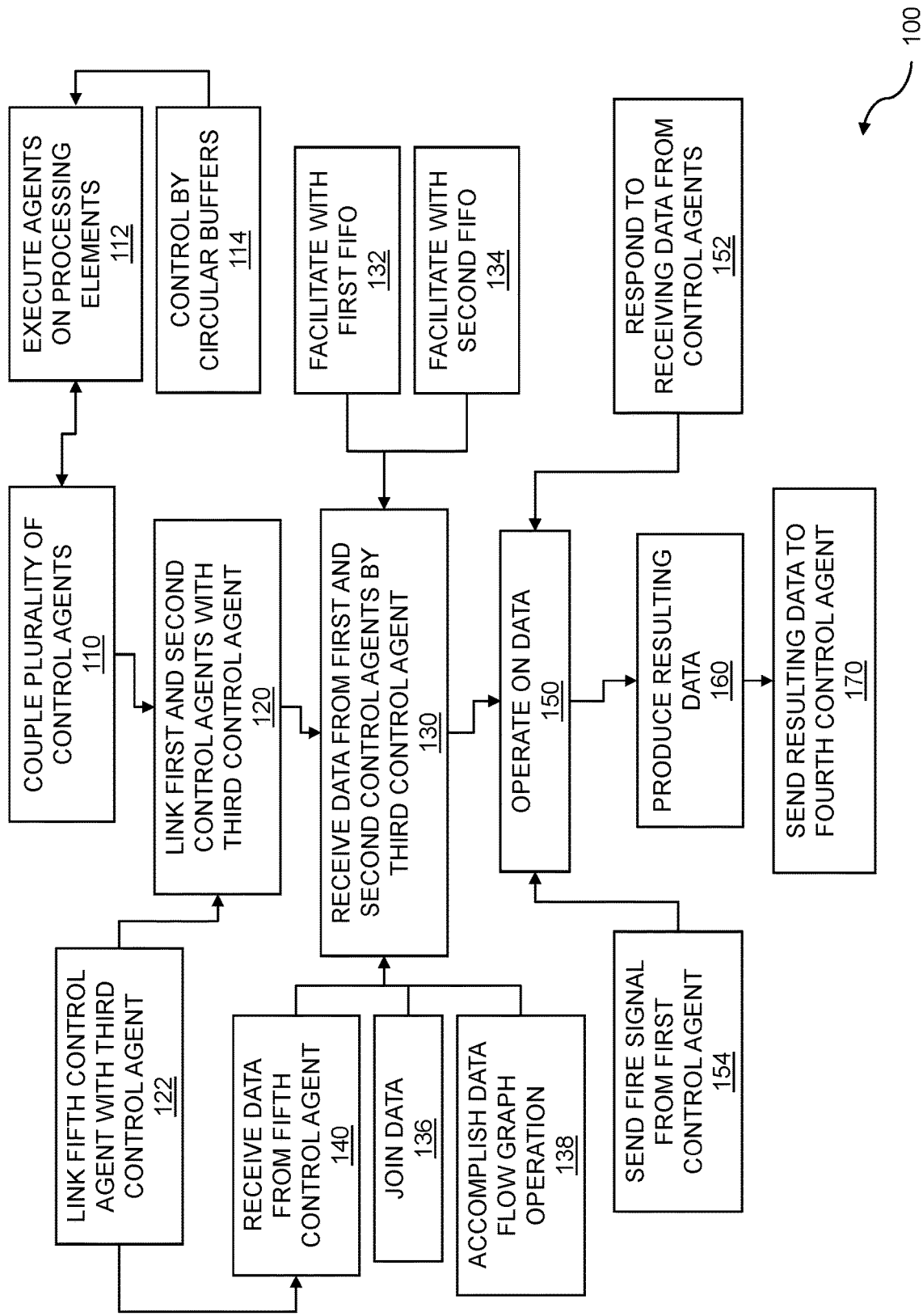
FIG. 1 is a flow diagram for data manipulation with joining.

Techniques are disclosed for managing data within a reconfigurable computing environment. In a multiple processing element environment, such as a mesh network or other suitable topology, there is an inherent need to pass data between and among processing elements. In many instances where multiple processing elements are working together to perform a given task, it is desirable to improve parallelism wherever possible in order to decrease overall execution time. The more computations that are done in parallel, the greater the savings in execution time that can be achieved. In some cases, subtasks may be divided among multiple processing elements. The output resulting from the subtasks is then merged by a downstream processing element. In such cases, a join operation can be used to combine data from multiple upstream processing elements. An efficient joining mechanism is an important aspect of achieving optimal performance of a multiple processing element system.

Data from multiple upstream processing elements is joined in a downstream processing element. A control agent executes on each processing element. A memory buffer is disposed between upstream processing elements and the downstream processing element. The downstream processing element is configured to automatically perform an operation based on the availability of valid data from the upstream processing elements. The memory buffer may be configured as a First-In-First-Out (FIFO) buffer. Registers within each processing element track the starting and ending addresses of each FIFO. In cases where there is no data present in a FIFO, a processing element can enter a sleep mode to save energy. When valid data arrives in a FIFO, a sleeping processing element can wake to process the data.

Based on the data consumption and production rates of each processing element, an additional FIFO may be established between two processing elements. In some cases, a processing element may produce small amounts of data at low intervals, in which case no FIFO may be needed and the processing element can send the data directly to another processing element. In other cases, a processing element may produce large amounts of data at frequent intervals, in which case an additional FIFO can help streamline the flow of data. This can be particularly important with bursty data production and/or bursty data consumption. In some embodiments, the data may be divided into blocks of various sizes. Data blocks above a predetermined threshold may be deemed as large blocks. For example, blocks greater than 512 bytes may be considered large blocks in some embodiments. Large data blocks may be routed among processing elements through FIFOs implemented as a memory element in external memory, while small data blocks (less than or equal to the predetermined threshold) may be passed among processing elements directly into onboard circular buffers without requiring a FIFO.

The FIFO size can include a width that is variable. In some cases, the FIFO entry width can vary on an entry-by-entry basis. Depending on the type of data read from and written to the FIFO, a different width can be selected in order to optimize FIFO usage. For example, 8-bit data would fit more naturally in a narrower FIFO, while 32-bit data would fit more naturally in a wider FIFO. The FIFO width may also account for tags, metadata, pointers, and so on. The width of the FIFO entry can be encoded in the data that will flow through the FIFO. In this manner, the FIFO size may change in width based on the encoding. In embodiments, the FIFO size includes a variable width. In embodiments, the width is encoded in the data flowing through the FIFO.

In a multiple processing element environment, data from a first processing element and a second processing element (upstream elements) is sent to a third processing element (downstream processing element) as part of a join/merge operation. In embodiments, a FIFO is configured between the upstream processing elements and the downstream processing element. Data signals may be sent between the upstream processing elements and the downstream processing element to coordinate the data exchange with the FIFOs. In embodiments, each upstream processing element has its own dedicated FIFO. The downstream element determines validity of data within the FIFOs. This can be accomplished using signals, Null Convention Logic (NCL) techniques, or other suitable techniques. This provides flexibility in the join operation in terms of how data validity is determined for data originating from the upstream processing elements.

An agent executing in software on each processing element interacts with dynamically established first-in-first-out (FIFO) buffers to coordinate the flow of data. The size of each FIFO may be created at run-time based on latency and/or synchronization requirements for a particular application. Multiple upstream processing elements feed intermediate results to a downstream processing element. The downstream processing element is activated and begins operating on data once the data from multiple downstream processing elements is determined to be valid.

FIG. 1 is a flow diagram showing data manipulation with joining. The flow 100 illustrates coupling a plurality of control agents and executing on a plurality of processing elements, wherein the plurality of processing elements comprises a reconfigurable fabric and wherein the plurality of processing elements is controlled by circular buffers. The flow 100 includes coupling a plurality of control agents 110 within a reconfigurable fabric. In embodiments, each control agent is a software process executing on a processing element. The flow includes executing agents on processing elements 112.

The flow 100 may further include control of the processing element by circular buffers 114. Each circular buffer can be loaded with a page of instructions which configures the digital circuit operated upon by the instructions in the circular buffer. When and if a digital circuit is required to be reconfigured, a different page of instructions can be loaded into the circular buffer and can overwrite the previous page of instructions that was in the circular buffer. A given circular buffer and the circuit element which the circular buffer controls can operate independently from other circular buffers and their concomitant circuit elements. The circular buffers and circuit elements can operate in an asynchronous manner. That is, the circular buffers and circuit elements can be self-clocked, self-timed, etc., and require no additional clock signal. Further, swapping out one page of instructions for another page of instructions does not require a retiming of the circuit elements. The circular buffers and circuit elements can operate as hum circuits, where a hum circuit is an asynchronous circuit that operates at its own resonant or "hum" frequency. In embodiments, each of the plurality of processing elements can be controlled by a unique circular buffer. In some cases, the initial configuration of the circular buffers may be established at compile time.

The flow 100 further includes linking the first and second control agents with a third control agent 120. The linking can include configuring a FIFO between the first and second control agents and the third control agent. The flow 100 further includes receiving data from the first and second control agents by the third control agent 130. The receiving may be facilitated by FIFO buffers. Hence, the flow may include facilitating with a first FIFO 132 and/or facilitating with a second FIFO 134. In embodiments, the receiving the data from the first control and second control agents comprises joining data. The received data can include tensors. The tensors can include vectors, vector spaces, and/or matrices of data. The tensors may be array of numbers or other mathematical objects for which operations such as addition and multiplication are defined. The flow further includes joining the data 136. The joining/merging of data combines intermediate results received from upstream control agents into a merged result that can be sent to a downstream control agent.

The flow may include accomplishing a data flow graph operation 138. In embodiments, the data flow graph may be processed as an input by an automated tool such as a compiler. The output of the compiler may include instructions for reconfiguring processing elements to perform as control agents. The reconfiguring can also include insertion of a FIFO between two processing elements of a plurality of processing elements.

The flow further includes operating on the data 150. The third control agent operates on the data. The operating on the data occurs after a validity determination is made for the received data from the first and second control agents. The flow includes responding to receiving data from control agents 152. The responding can include performing a validity determination. Thus, in embodiments, data received from the first control agent is determined to be valid. The validity determination can be made utilizing a hardware signal, a Null Convention Logic state, a software signal, a semaphore, or another suitable method. In embodiments, the flow includes sending a FIRE signal from the first control agent to the third control agent 154. In embodiments, the FIRE signal can serve as a data validity signal. In embodiments, the data validity is the criterion for starting the operating on the data. Furthermore, in embodiments, the data received from the second control agent is determined to be valid.

The flow continues with producing resulting data 160. The resulting data can be a function of the received data. The resulting data can be a joining and/or merging of the received data. The operation can take multiple intermediate results and combine them into a single result. The operation can include, but is not limited to, addition, multiplication, division, subtraction, logical shifting, logical manipulation (ORing, NORing, ANDing, XORing, and the like), and/or floating-point operations. In embodiments, the operating includes generating a tensor product. The operating can include operations such as matrix multiplication, determinant generation, multiplication of a matrix by a scalar value, and the like. The operating can also include generating a tensor contraction. A tensor contraction is an operation that reduces the number of values. The operation can include a raising of a tensor index. A tensor index can be an indication of the dimensionality of the tensor. Similarly, the operation can include a lowering of a tensor index. Embodiments can include producing resulting data based on the operating on the data. Furthermore, in embodiments, the operating includes merging a plurality of tensors received from the first control agent and the second control agent. The flow 100 further includes sending resulting data to a fourth control agent 170. The fourth control agent can be operating on a processing element that is downstream of the processing element that the third control agent is operating on. The resulting data can be an input to an operation being performed by the fourth control agent.

The flow 100 may further include receiving data from a fifth control agent 140 by the third control agent. The flow may further include linking the fifth control agent with the third control agent 122. Thus, in embodiments, there can be more than two upstream control agents. In embodiments, the flow 100 includes linking a fifth control agent, from the plurality of control agents, with the third control agent. For example, there can be three, four, or more upstream control agents that provide data in the form of tensors, tuples, arrays, or unitary values to a downstream control agent for merging and/or joining. In some embodiments, the downstream control agent waits until each of the multiple upstream control agents has valid data. In some embodiments, the downstream control agent identifies an operation classification as associative or non-associative. In cases where the operation classification is associative, the downstream control agent may begin the operation before all of the upstream control agents have indicated valid data. For example, in the case of three upstream control agents and an associative operation such as multiplication of three intermediate results, as valid data arrives from two of the three upstream control agents A, B, and C, the downstream control agent can start the operation by multiplying the first two received values from control agent A and control agent B. Then, when control agent C indicates valid data, the downstream control agent multiplies the result of the first two received values by the value from control agent C to derive the result. In this way, processing time is optimized since the downstream processing element starts to perform the operation as soon as it can begin processing some data, even if the entirety of data has not yet arrived. In the event that the operation to be performed is non-associative, such as subtraction or division, the downstream control agent can wait until each of the upstream control agents indicates the arrival of valid data before starting the operation. In embodiments, the operation classification may be encoded into an opcode or machine instruction that resides in a circular buffer within a processing element. The encoding can take the form of a bit at a predetermined position within the opcode. For example, in a 64-bit instruction set, bit 60 can be designated as an associative bit. Any operations that are associative can have bit 60 set, indicating that the instruction is associative. Operations that are not guaranteed to be associative can have a zero at bit 60 to indicate the non-associative status of that operation.

The flow 100 includes linking a first control agent and a second control agent, from the plurality of control agents, with a third control agent, from the plurality of control agents. The flow 100 includes receiving data from the first and second control agents by the third control agent, wherein a first FIFO memory is employed by the first control agent to facilitate the receiving of the data by the third control agent, and a second FIFO memory is employed by the second control agent to facilitate the receiving of the data by the third control agent. In embodiments, the flow 100 includes operating on the data, received from both the first and second control agents, by the third control agent. In embodiments, resulting data is produced based on the operating on the data. Embodiments include sending the resulting data to a fourth control agent from the plurality of control agents. In embodiments, the operating on the data is in response to receiving the data from the first control agent and the second control agent. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
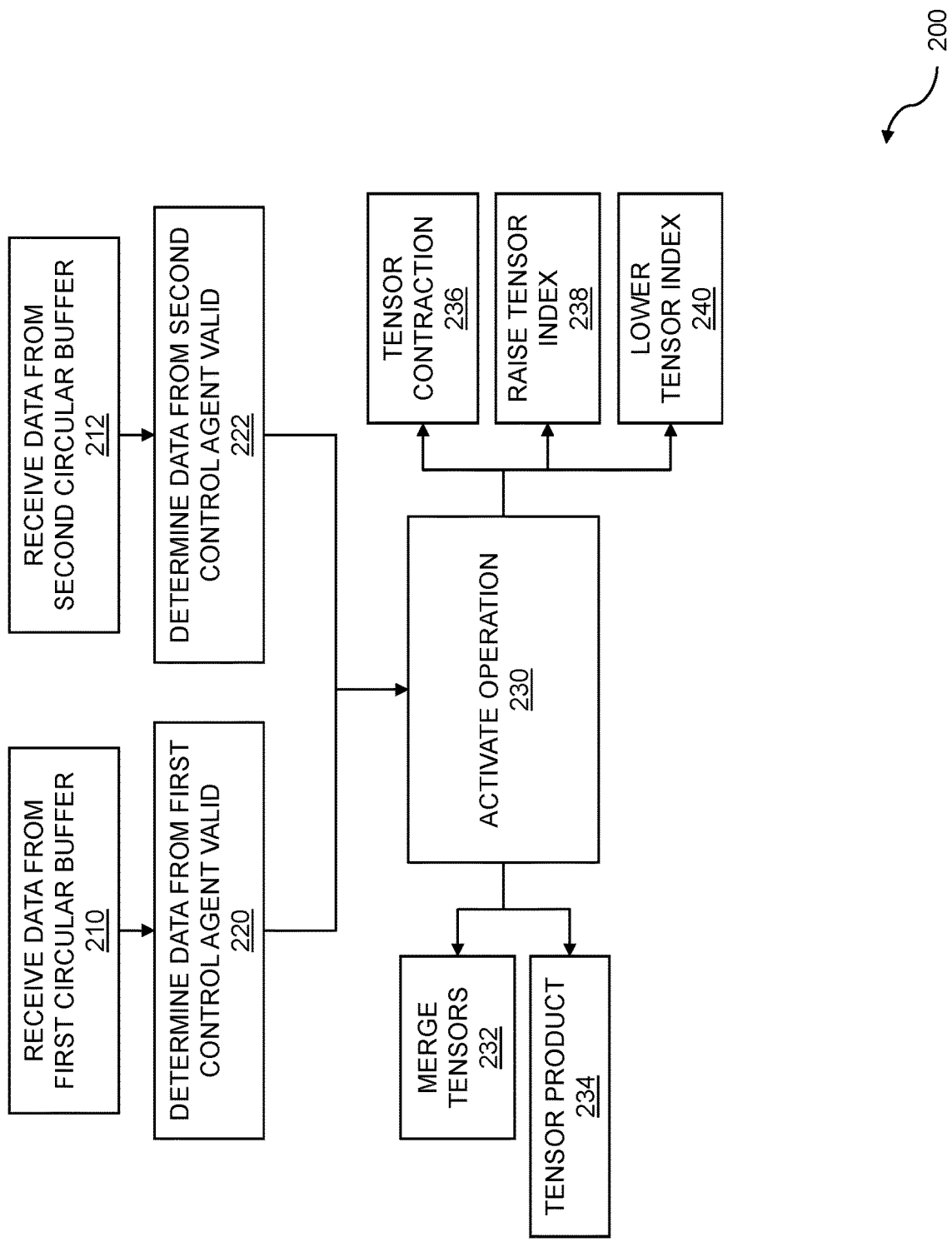
FIG. 2 is a flow diagram for operating on data.

FIG. 2 is a flow diagram for operating on data. The flow 200 includes receiving data from a first circular buffer 210. The first circular buffer may be configured to be read by a first control agent. The flow 200 also includes receiving data from a second circular buffer 212. The second circular buffer may be configured to be read by a second control agent. The flow 200 continues with determining that data from the first control agent is valid 220, and also determining that data from the second control agent is valid 222. The determination of validity can include a hardware signal such as a FIRE signal, or other type of data ready signal. In embodiments, a combination of signal states may be used to indicate validity. In embodiments, Null Convention Logic is used to determine validity. Null Convention Logic (NCL) includes transistor circuits having a plurality of input/output lines, each having an asserted state and a null state.

The flow continues with activating an operation 230. The operation may include merging tensors 232 and/or producing a tensor product 234. The operation may include tensor contraction 236, in which case the number of terms is reduced as compared with the number of terms received from the first and second control agents. The operation may include raising a tensor index 238. Alternatively, the operation may include lowering a tensor index 240. In embodiments, the operating is based on the data being valid. Thus, in embodiments, the operating is activated by the data being valid. The operating can include merging a plurality of tensors received from the first control agent and the second control agent. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3A:
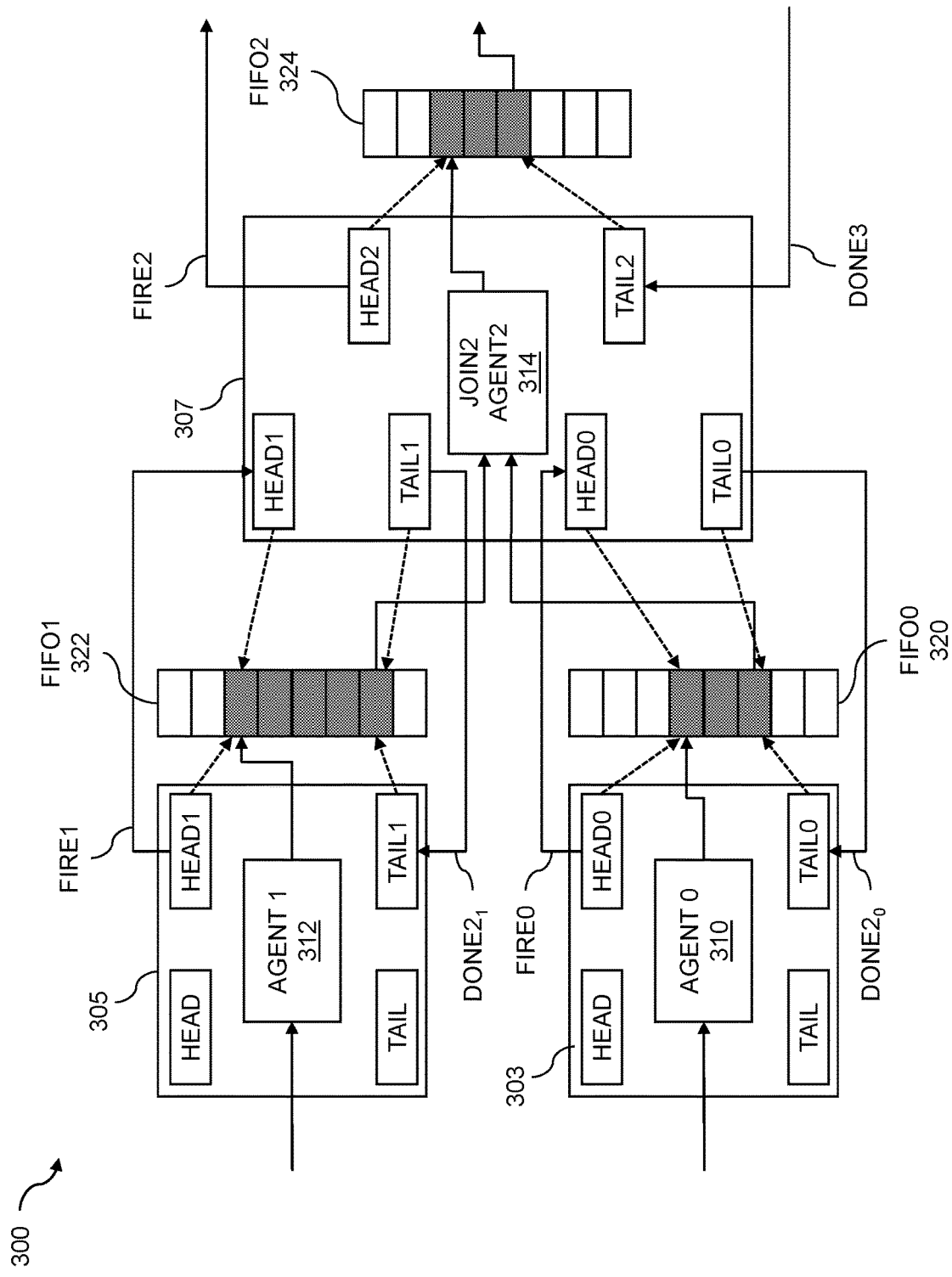
FIG. 3A shows merging tensors from FIFO0 and FIFO1.

FIG. 3A shows merging tensors from FIFO0 and FIFO1. The circuit 300 includes a first processing element 303, a second processing element 305, and a third processing element 307. A first FIFO 320 (FIFO0) is configured and disposed to receive data from processing element 303. A second FIFO 322 (FIFO1) is configured and disposed to receive data from processing element 305. A first control agent 310 (AGENT0) executes on processing element 303. A second control agent 312 (AGENT1) executes on processing element 305.

In embodiments, the FIFOs can comprise blocks of memory designated by starting addresses and ending addresses. The HEAD and TAIL registers/pointers of each processing element can be configured to reference the starting and ending addresses, respectively. The starting addresses and the ending addresses can be stored with instructions in circular buffers. In embodiments, as agents executing on the processing elements place data in a FIFO or remove data from a FIFO, a corresponding read and write pointer or register is updated to refer to the next location to be read to or written from. In embodiments, as agents executing on the processing elements place data on a FIFO or remove data from a FIFO, the head and/or tail pointer/ register is updated to refer to the next location to be read to or written from. In embodiments, data in the first FIFO includes a first head and a first tail. Furthermore, in embodiments, the data in the second FIFO includes a second head and a second tail.

FIFO0 320 and FIFO1 322 may be of different sizes. As indicated in FIG. 3A, FIFO0 320 is allocated to include three blocks of memory (indicated by shaded blocks within FIFO0 320) and FIFO1 is allocated to include five blocks of memory (indicated by the shaded blocks within FIFO1 322). Thus, the FIFO sizes can be different. Their size can be determined based on a variety of factors such as output data rates and/or latency requirements of the control agents.

A third control agent 314 (AGENT2) operates as a joining agent that joins/merges data from the first control agent and the second control agent. Thus, in embodiments, the joining data is accomplished by the third control agent. The third control agent 314 executes on processing element 307. The third control agent reads data from both FIFO0 320 and FIFO1 322 once the data in each FIFO is determined to be valid. Signals such as the FIRE signals and DONE signals can be used to synchronize data flow between processing elements. In embodiments, the first control agent 310 issues a FIRE0 signal to the third control agent 314 to indicate the presence of valid data in FIFO0 320. Similarly, the second control agent 312 issues a FIRE1 signal to the third control agent 314 to indicate the presence of valid data in FIFO1 322. The third control agent 314 issues a DONE2$_0$ signal to control agent 310 upon completion of reading data from FIFO0 320. This serves as an indication to control agent 310 that the FIFO0 320 is ready to receive new data. Similarly, the third control agent 314 issues a DONE2$_1$ signal to control agent 312 upon completion of reading data from FIFO1 322. This serves as an indication to control agent 312 that the FIFO1 322 is ready to receive new data. Thus, embodiments include sending a fire signal from the first control agent to the third control agent to facilitate the operating by the third control agent.

The third control agent 314 performs a join/merge operation on the received data from the upstream control agents (agent 310 and agent 312). The result of the operation is written to FIFO2 324 which can then be retrieved by another downstream processing element (not shown). Once the result is written to FIFO2 324, the processing element 307 asserts FIRE2 signal to indicate to the downstream control agent that new data is available in FIFO2 324. Once the data is consumed by the downstream control agent, the downstream processing element asserts the DONE3 signal to indicate that the result has been successfully retrieved from FIFO2 324.

The operation to join or merge the results can include a logical operation, a concatenation, and/or a mathematical operation. In embodiments, the received data from FIFO0 320 and FIFO1 322 includes tensors. The tensors may represent arrays, vectors, vector spaces, and/or scalar values. The operations can include matrix multiplication, matrix addition, matrix subtraction, determinant computation, and the like. Thus, in embodiments, the data from the first FIFO comprises a first tensor. Furthermore, in embodiments, the data from the second FIFO comprises a second tensor. The result of the joining can be placed in FIFO2 324 by control agent 314. In embodiments, the operating by the third agent on the first tensor and the second tensor produces a third tensor. In embodiments, the receiving data by the third control agent is only accomplished when there is output space available for results from the third control agent. In some cases, the receiving of data by the third control agent comprises or is referred to as consuming the data. Often, output space is available in a third FIFO employed between the third control agent and the fourth control agent. In some embodiments, processing by the third control agent is delayed until output space is available. The processing by the third control agent can be suspended by stopping the rotating of a circular buffer within the circular buffers.

Figure 3B:
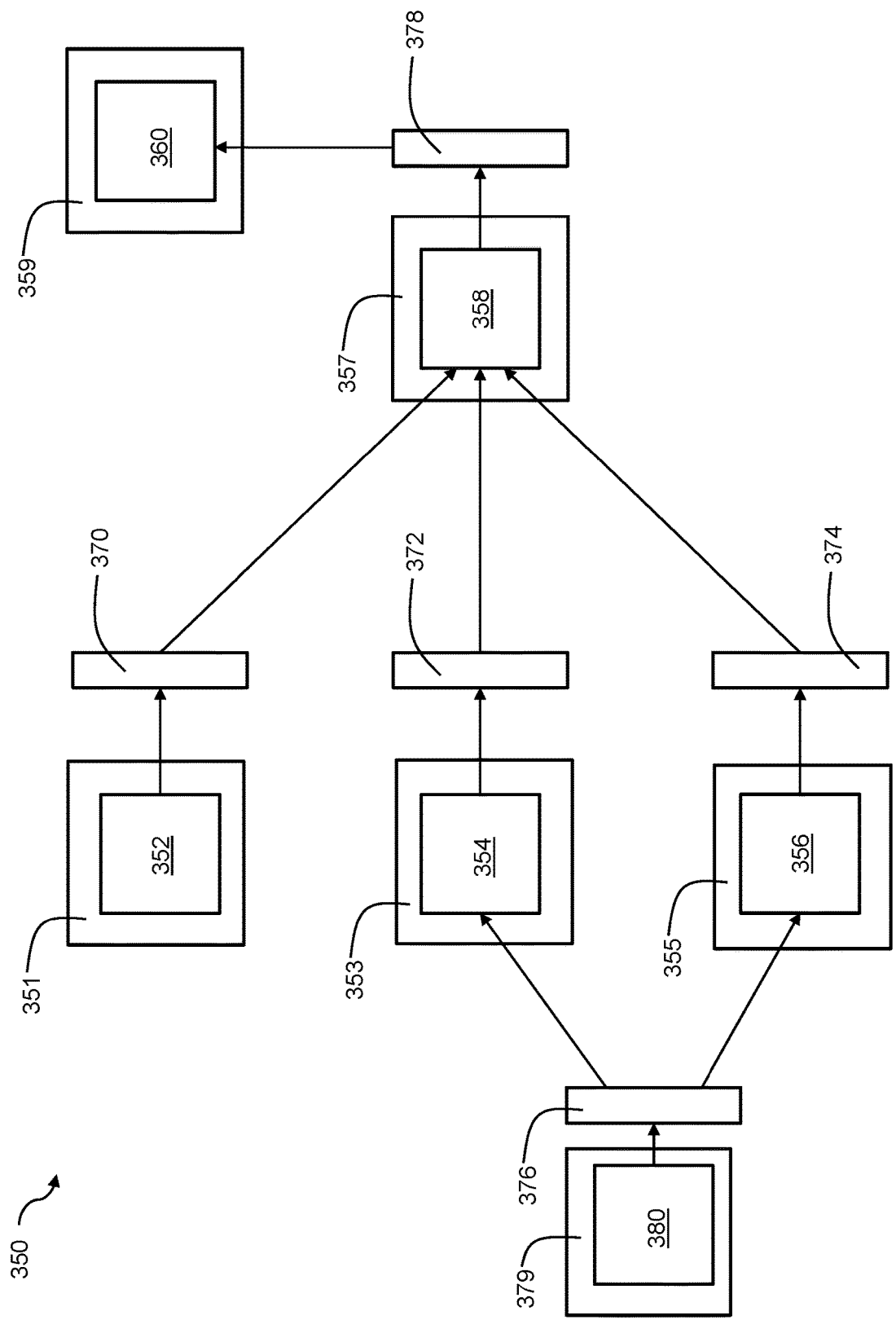
FIG. 3B shows an example with multiple control agents.

FIG. 3B shows an example 350 with multiple control agents. Example 350 includes control agent 352 executing on processing element 351. Data is output from processing element 351 into FIFO 370. Thus, in embodiments, a third FIFO memory is interposed between the fifth control agent and the third control agent. Furthermore, in embodiments, the third FIFO memory facilitates the receiving of the data by the third control agent. In the example of FIG. 3B, control agent 356 may be considered as a first control agent, control agent 354 may be considered as a second control agent, control agent 358 may be considered as a third control agent, control agent 360 may be considered as a fourth control agent, control agent 352 may be considered as a fifth control agent, and control agent 380 may be considered as a sixth control agent. Other configurations with more or fewer control agents are possible. The processing elements shown in FIG. 3B are similar to those depicted in FIG. 3A. However, FIG. 3B is illustrated in a simplified format with some of the details depicted in FIG. 3A not being shown in FIG. 3B.

Control agent 354 executes on processing element 353. Data is output from processing element 353 into FIFO 372. Control agent 356 executes on processing element 355. Data is output from processing element 355 into FIFO 374. Control agents 352, 354, and 356 are upstream of processing element 357. Control agent 358 executes on processing element 357, and performs a join/merge operation on data from control agents 352, 354, and 356. In embodiments, control agent 358 activates upon detection of a data valid condition in two or more upstream control agents. In embodiments, control agent 358 determines if the join/merge operation is associative. If the operation is associative, the operation may be activated as a result of a partial data ready condition of at least two upstream processing elements. If the operation is non-associative, the operation may be activated as a result of a partial data ready condition of all of the immediately upstream processing elements. For example, if the operation performed by control agent 358 is a multiplication of the data provided by control agent 352, control agent 354, and control agent 356, then control agent 358 can start the multiplication as soon as any two results become available from the immediately upstream control agents (352, 354, 356). When the third result becomes available, the control agent 358 can complete the multiplication operation. In another example, if the operation performed by the control agent is a division/subtraction operation, the control agent 358 activates only when the data is available from all of the immediately upstream control agents (352, 354, 356), since that is a non-associative operation. In this way, processing throughput can be increased wherever possible by exploiting the associative nature of certain join/merge operations. The control agent 358 then passes the result downstream by writing it to FIFO 378. Control agent 360, executing on processing element 359, retrieves the data from FIFO 378.

Control agent 354 and control agent 356 receive input from an upstream fork operation from control agent 380, which executes on processing element 379. Control agent 380 outputs data to FIFO 376. Control agent 354 may read data from one portion of FIFO 376 while control agent 356 reads data from another portion of FIFO 376. In other embodiments, two FIFOs may be used, where control agent 354 retrieves input data from one FIFO, and control agent 356 retrieves data from another FIFO. Thus, in embodiments, the data from the first control agent is derived from a previous fork operation.

In many instances where multiple processing elements are working together to perform a given task, it is desirable to improve parallelism wherever possible to decrease overall execution time. The more computations that are done in parallel, the greater the savings in execution time that can be achieved. In some cases, subtasks may be divided among multiple processing elements. In such cases, a fork operation can be used to pass data to multiple downstream processing elements simultaneously. Thus, control agent 380 performs a fork operation so that control agent 354 and control agent 356 can concurrently process data and provide results to control agent 358.

FIG. 4 illustrates an example 400 of pseudocode for join agent 314 of FIG. 3A. A plurality of process agents can be triggered by instructions stored in circular buffers. A processing element, upon detecting an instruction, can invoke the process agent to begin a join operation. The pseudocode can include logic for checking if an input FIFO is empty, and if so, can cause it to enter sleep mode. In the pseudocode, FIFO0 represents input FIFO0 320 from FIG. 3. Similarly, FIFO1 represents input FIFO1 322 from FIG. 3A. These FIFOs contain input data that is to be joined/merged by a downstream control agent.

If some criteria are not met, the processing element 307 can enter a sleep mode. The sleep mode can be a low power mode. The low power mode can be a mode operating at a reduced clock speed and/or reduced voltage. The pseudocode can include logic for checking if its output FIFO2 324 is full, and cause it to enter sleep mode if the output FIFO is full. Thus, in the example of FIG. 3A, processing element 307 can enter a sleep mode if FIFO2 324 is full. The pseudocode can include logic to check for the presence of a FIRE signal or DONE signal and transition from a sleep mode to an awake state upon detecting such a condition. A processing element associated with the third control agent is brought out of a sleep state when the data from the first control agent is determined to be valid. In embodiments, a processing element associated with the third control agent is brought out of a sleep state by the data from the first control agent being valid. In some embodiments, the third control agent is brought out of a sleep state by the data from the second control agent also being valid. In embodiments, a circular buffer within the circular buffers stops rotation until the data becomes valid.

Referring again to the example of FIG. 3A, processing element 307 can transition to an awake state from a sleep mode upon detecting an asserted FIRE0 signal and/or FIRE1 signal originating from an upstream processing element, which indicates that new data is available for processing element 307.

Similarly, processing element 307 can transition to an awake state from a sleep state upon detecting an asserted DONE3 signal originating from a downstream processing element, which indicates that the downstream processing element is ready to accept more data placed in FIFO2 324. The pseudocode can include logic for incrementing a head/tail pointer/register based on the presence of a FIRE signal or DONE signal. Furthermore, the pseudocode can include logic for identifying the associative status of an operation. If the operation is associative, the control agent can begin the join operation with less than all of the input data being ready in some cases. This can improve overall processor performance by allowing operations to proceed in those cases.

Figure 5:
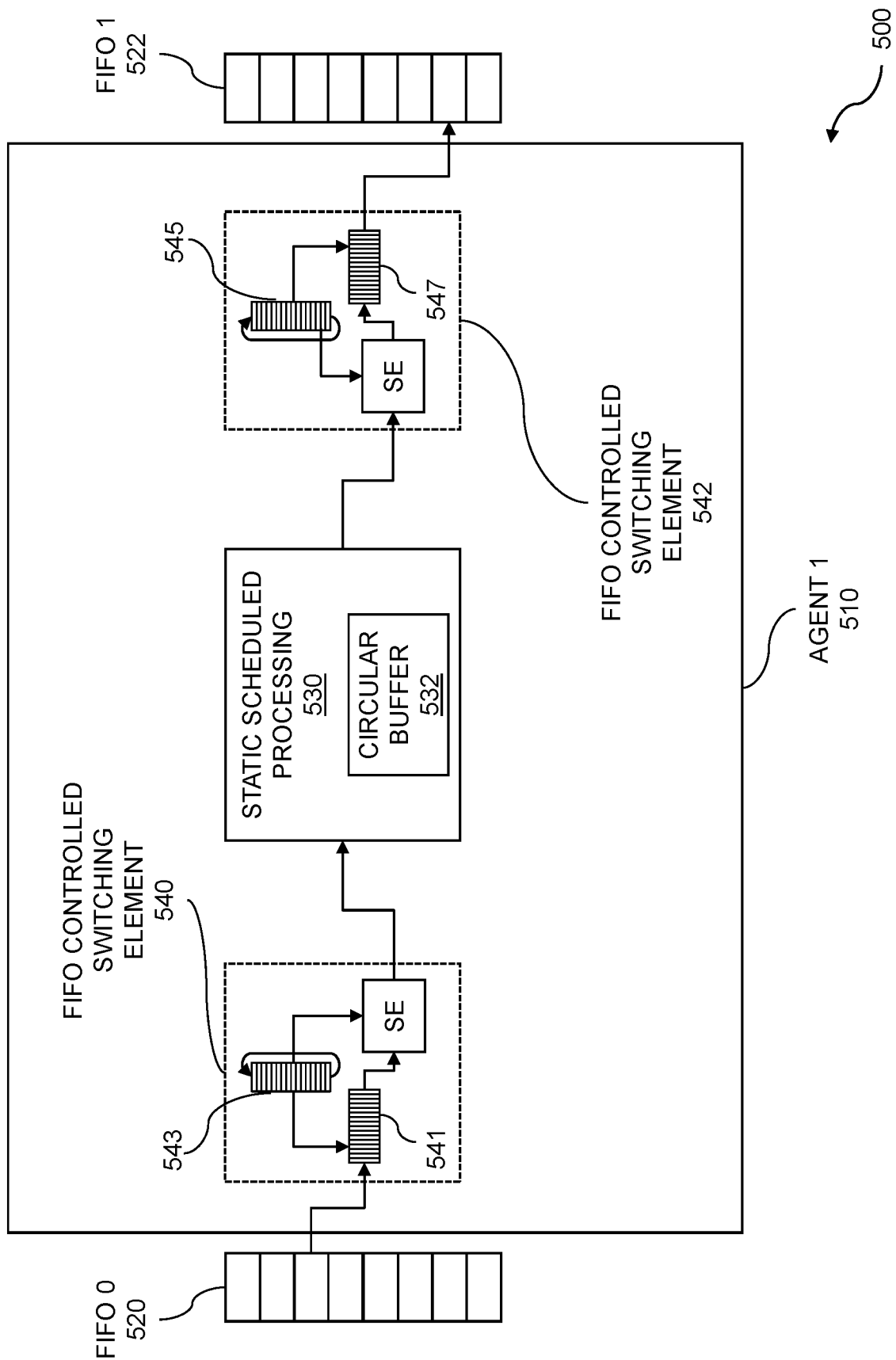
FIG. 5 shows scheduled sections relating to an agent.

FIG. 5 shows an example 500 of scheduled sections relating to an agent. A FIFO 520 serves as an input FIFO for a control agent 510. Data from FIFO 520 is read into local buffer 541 of a FIFO controlled switching element 540. Circular buffer 543 may contain instructions that are executed by a switching element (SE), and may modify data based on one or more logical operations, including, but not limited to, XOR, OR, AND, NAND, and/or NOR. The plurality of processing elements can be controlled by circular buffers. The modified data may be passed to a circular buffer 532 under static scheduled processing 530. Thus, the scheduling of circular buffer 532 may be performed at compile time. The instructions loaded into circular buffer 532 may occur as part of a program initialization, and may remain in the circular buffer 532 throughout the execution of the program (control agent). The circular buffer 532 may provide data to a FIFO controlled switching element 542. Circular buffer 545 may rotate to provide a plurality of instructions/operations to modify and/or transfer data to data buffer 547, which is then transferred to external FIFO 522.

A process agent can include multiple components. An input component handles retrieval of data from an input FIFO. For example, agent 510 receives input from FIFO 520. An output component handles the sending of data to an output FIFO. For example, agent 510 provides data to FIFO 522. A signaling component can signal to process agents executing on neighboring processing elements about conditions of a FIFO. For example, a process agent can issue a FIRE signal to another process agent operating on another processing element when new data is available in a FIFO that was previously empty. Similarly, a process agent can issue a DONE signal to another process agent operating on another processing element when new space is available in a FIFO that was previously full. In this way, the process agent facilitates communication of data and FIFO states among neighboring processing elements to enable complex computations with multiple processing elements in an interconnected topology.

Figure 6:
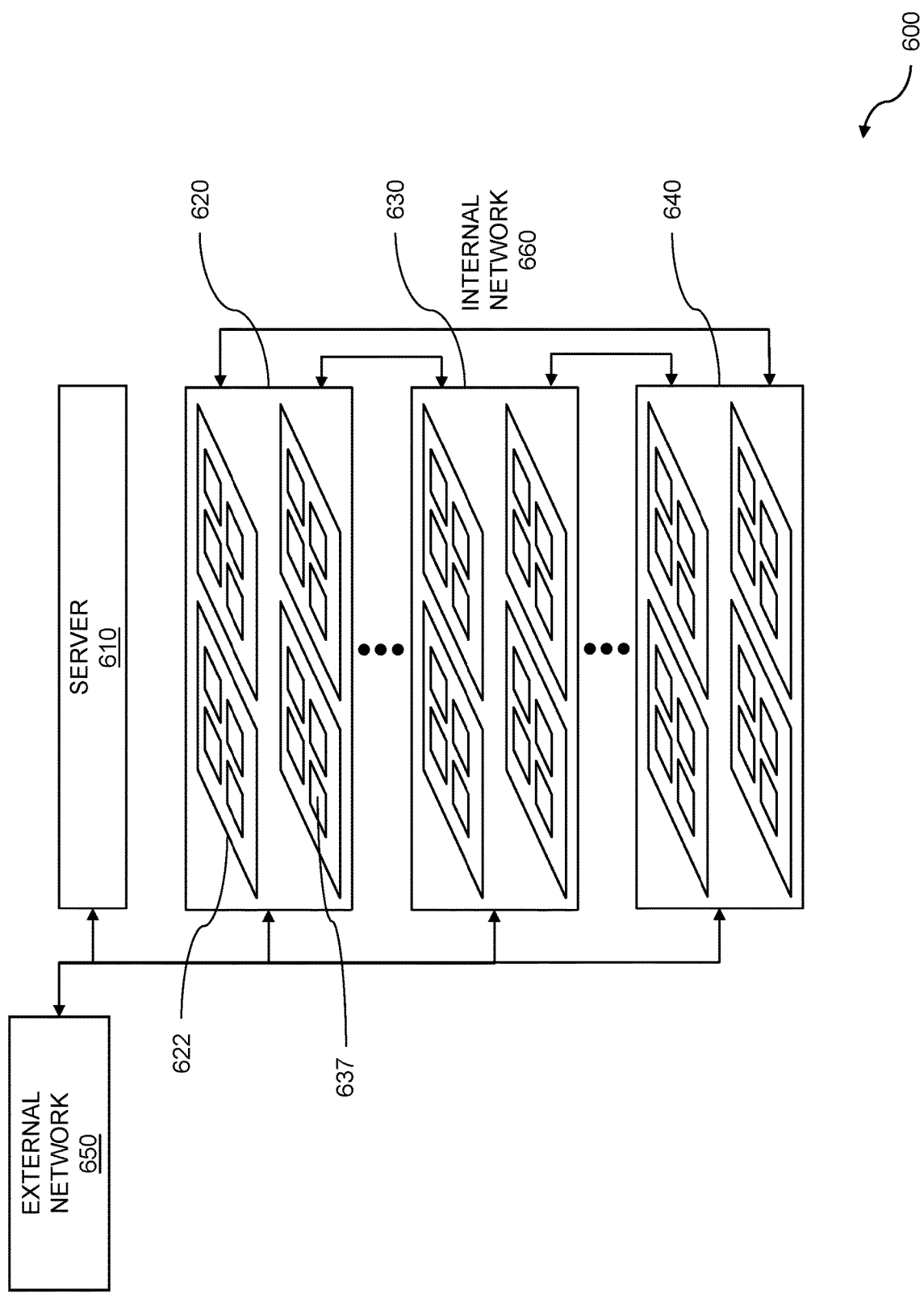
FIG. 6 illustrates a server allocating FIFOs and processing elements.

FIG. 6 illustrates an example of a system 600 including a server 610 allocating FIFOs and processing elements. In embodiments, system 600 includes one or more boxes, indicated by callouts 620, 630, and 640. Each box may have one or more boards, indicated generally as 622. Each board comprises one or more chips, indicated generally as 637. Each chip may include one or more processing elements, where at least some of the processing elements may execute a process agent. An internal network 660 allows for communication between the boxes such that processing elements on one box can provide and/or receive results from processing elements on another box.

The server 610 may be a computer executing programs on one or more processors based on instructions contained in a non-transitory computer readable medium. The server 610 may perform reconfiguring of a mesh networked computer system comprising a plurality of processing elements with a FIFO between one or more pairs of processing elements. In some embodiments, each pair of processing elements has a dedicated FIFO configured to pass data between the processing elements of the pair. The server 610 may receive instructions and/or input data from external network 650. The external network may provide information that includes, but is not limited to, hardware description language instructions (e.g. Verilog, VHDL, or the like), flow graphs, source code, or information in another suitable format.

The server 610 may collect performance statistics on the operation of the collection of processing elements. The performance statistics can include number of fork operations, join operations, average sleep time of a processing element, and/or a histogram of the sleep time of each processing element. Any outlier processing elements that sleep more than a predetermined threshold can be identified. In embodiments, the server can resize FIFOs or create new FIFOs to reduce the sleep time of a processing element that exceeds the predetermined threshold. Sleep time is essentially time when a processing element is not producing meaningful results, so it is generally desirable to minimize the amount of time a processing element spends in a sleep mode. In some embodiments, the server 610 may serve as an allocation manager to process requests for adding or freeing FIFOs, and/or changing the size of existing FIFOs in order to optimize operation of the processing elements.

In some embodiments, the server may receive optimization settings from the external network 650. The optimization settings may include a setting to optimize for speed, optimize for memory usage, or balance between speed and memory usage. Additionally, optimization settings may include constraints on the topology, such as a maximum number of paths that may enter or exit a processing element, maximum data block size, and other settings. Thus, the server 610 can perform a reconfiguration based on user-specified parameters via external network 650.

Figure 7:
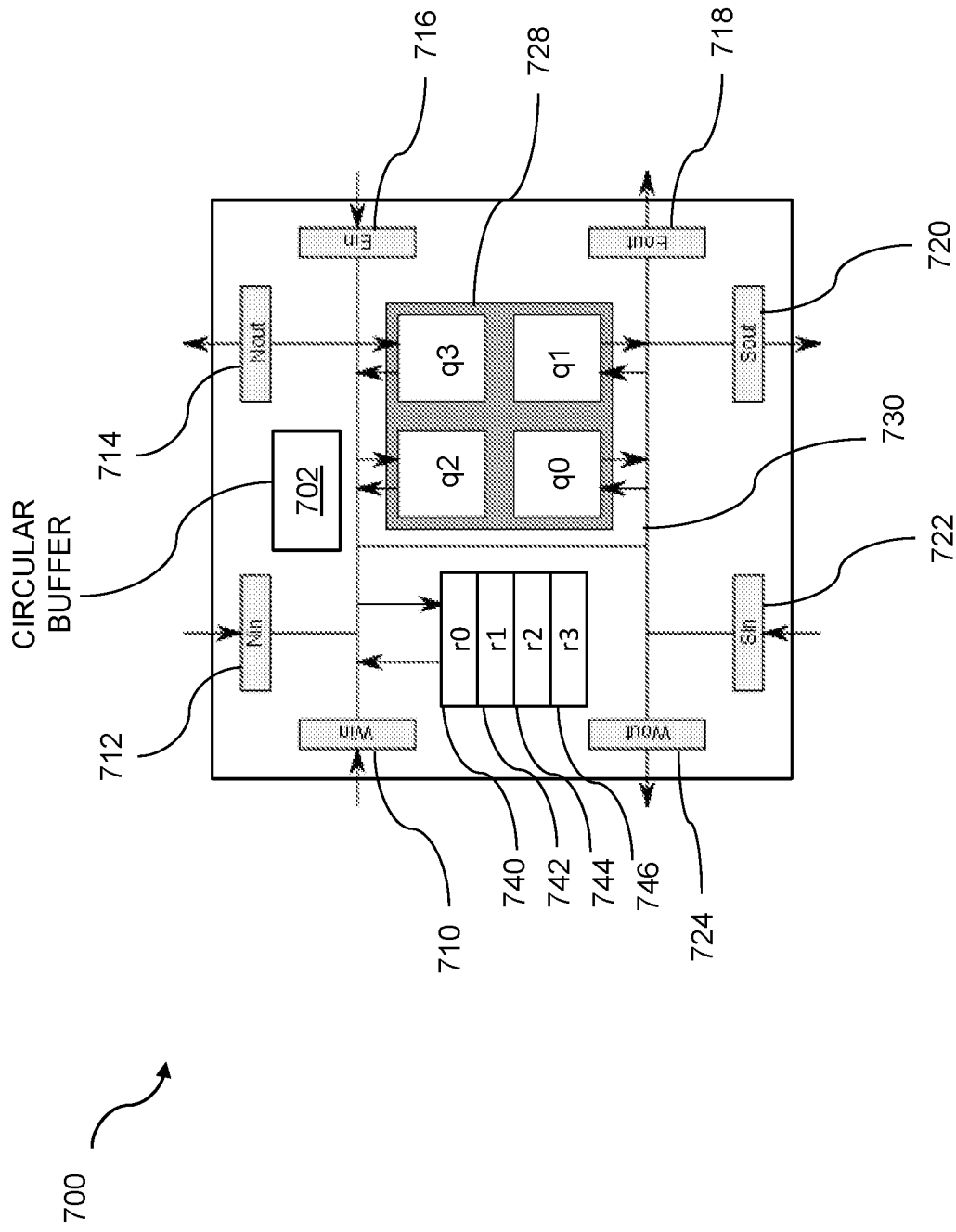
FIG. 7 shows a cluster for coarse-grained reconfigurable processing.

FIG. 7 is an example cluster 700 for coarse-grained reconfigurable processing. Data can be obtained from a first switching unit, where the first switching unit can be controlled by a first circular buffer. Data can be sent to a second switching element, where the second switching element can be controlled by a second circular buffer. The obtaining data from the first switching element and the sending data to the second switching element can include a direct memory access (DMA). The cluster 700 comprises a circular buffer 702. The circular buffer 702 can be referred to as a main circular buffer or a switch-instruction circular buffer. In some embodiments, the cluster 700 comprises additional circular buffers corresponding to processing elements within the cluster. The additional circular buffers can be referred to as processor instruction circular buffers. The example cluster 700 comprises a plurality of logical elements, configurable connections between the logical elements, and a circular buffer 702 controlling the configurable connections. The logical elements can further comprise one or more of switching elements, processing elements, or storage elements. The example cluster 700 also comprises four processing elements—q0, q1, q2, and q3. The four processing elements can collectively be referred to as a "quad," and can be jointly indicated by a grey reference box 728. In embodiments, there is intercommunication among and between each of the four processing elements. In embodiments, the circular buffer 702 controls the passing of data to the quad of processing elements 728 through switching elements. In embodiments, the four processing elements 728 comprise a processing cluster. In some cases, the processing elements can be placed into a sleep state. In embodiments, the processing elements wake up from a sleep state when valid data is applied to the inputs of the processing elements. In embodiments, the individual processors of a processing cluster share data and/or instruction caches. The individual processors of a processing cluster can implement message transfer via a bus or shared memory interface. Power gating can be applied to one or more processors (e.g. q1) in order to reduce power.

The cluster 700 can further comprise storage elements coupled to the configurable connections. As shown, the cluster 700 comprises four storage elements—r0 740, r1 742, r2 744, and r3 746. The cluster 700 further comprises a north input (Nin) 712, a north output (Nout) 714, an east input (Ein) 716, an east output (Eout) 718, a south input (Sin) 722, a south output (Sout) 720, a west input (Win) 710, and a west output (Wout) 724. The circular buffer 702 can contain switch instructions that implement configurable connections. For example, an instruction effectively connects the west input 710 with the north output 714 and the east output 718 and this routing is accomplished via bus 730. The cluster 700 can further comprise a plurality of circular buffers residing on a semiconductor chip where the plurality of circular buffers control unique, configurable connections between the logical elements. The storage elements can include instruction random access memory (I-RAM) and data random access memory (D-RAM). The I-RAM and the D-RAM can be quad I-RAM and quad D-RAM, respectively, where the I-RAM and/or the D-RAM supply instructions and/or data, respectively, to the processing quad of a switching element.

A preprocessor or compiler can be configured to prevent data collisions within the circular buffer 702. The prevention of collisions can be accomplished by inserting no-op or sleep instructions into the circular buffer (pipeline). Alternatively, in order to prevent a collision on an output port, intermediate data can be stored in registers for one or more pipeline cycles before being sent out on the output port. In other situations, the preprocessor can change one switching instruction to another switching instruction to avoid a conflict. For example, in some instances the preprocessor can change an instruction placing data on the west output 724 to an instruction placing data on the south output 720, such that the data can be output on both output ports within the same pipeline cycle. In a case where data needs to travel to a cluster that is both south and west of the cluster 700, it can be more efficient to send the data directly to the south output port rather than to store the data in a register first, and then send the data to the west output on a subsequent pipeline cycle.

An L2 switch interacts with the instruction set. A switch instruction typically has a source and a destination. Data is accepted from the source and sent to the destination. There are several sources (e.g. any of the quads within a cluster, any of the L2 directions (North, East, South, West), a switch register, one of the quad RAMs (data RAM, IRAM, PE/Co Processor Register). As an example, to accept data from any L2 direction, a "valid" bit is used to inform the switch that the data flowing through the fabric is indeed valid. The switch will select the valid data from the set of specified inputs. For this to function properly, only one input can have valid data, while the other inputs must all be marked as invalid. It should be noted that this fan-in operation at the switch inputs operates independently for control and data. There is no requirement for a fan-in mux to select data and control bits from the same input source. Data-valid bits are used to select valid data, and control-valid bits are used to select the valid control input. There are many sources and destinations for the switching element, which can result in too many instruction combinations, so the L2 switch has a fan-in function enabling input data to arrive from one and only one input source. The valid input sources are specified by the instruction. Switch instructions are therefore formed by combining a number of fan-in operations and sending the result to a number of specified switch outputs.

In the event of a software error, multiple valid bits may arrive at an input. In this case, the hardware implementation can implement any safe function of the two inputs. For example, the fan-in could implement a logical OR of the input data. Any output data is acceptable because the input condition is an error, so long as no damage is done to the silicon. In the event that a bit is set to '1' for both inputs, an output bit should also be set to '1'. A switch instruction can accept data from any quad or from any neighboring L2 switch. A switch instruction can also accept data from a register or a microDMA controller. If the input is from a register, the register number is specified. Fan-in may not be supported for many registers as only one register can be read in a given cycle. If the input is from a microDMA controller, a DMA protocol is used for addressing the resource.

For many applications, the reconfigurable fabric can be a DMA slave, which enables a host processor to gain direct access to the instruction and data RAMs (and registers) that are located within the quads in the cluster. DMA transfers are initiated by the host processor on a system bus. Several DMA paths can propagate through the fabric in parallel. The DMA paths generally start or finish at a streaming interface to the processor system bus. DMA paths may be horizontal, vertical or a combination of the two (as determined by a router). To facilitate high bandwidth DMA transfers, several DMA paths can enter the fabric at different times, providing both spatial and temporal multiplexing of DMA channels. Some DMA transfers can be initiated within the fabric, enabling DMA transfers between the block RAMs without external supervision. It is possible for a cluster "A", to initiate a transfer of data between cluster "B" and cluster "C" without any involvement of the processing elements in clusters "B" and "C". Furthermore, cluster "A" can initiate a fan-out transfer of data from cluster "B" to clusters "C", "D", and so on, where each destination cluster writes a copy of the DMA data to different locations within their Quad RAMs. A DMA mechanism may also be used for programming instructions into the instruction RAMs.

Accesses to RAM in different clusters can travel through the same DMA path, but the transactions must be separately defined. A maximum block size for a single DMA transfer can be 8 KB. Accesses to data RAMs can be performed either when the processors are running, or while the processors are in a low power sleep state. Accesses to the instruction RAMs and the PE and Co-Processor Registers may be performed during configuration mode. The quad RAMs may have a single read/write port with a single address decoder, thus allowing access to them to be shared by the quads and the switches. The static scheduler (i.e. the router) determines when a switch is granted access to the RAMs in the cluster. The paths for DMA transfers are formed by the router by placing special DMA instructions into the switches and determining when the switches can access the data RAMs. A microDMA controller within each L2 switch is used to complete data transfers. DMA controller parameters can be programmed using a simple protocol that forms the "header" of each access.

Figure 8:
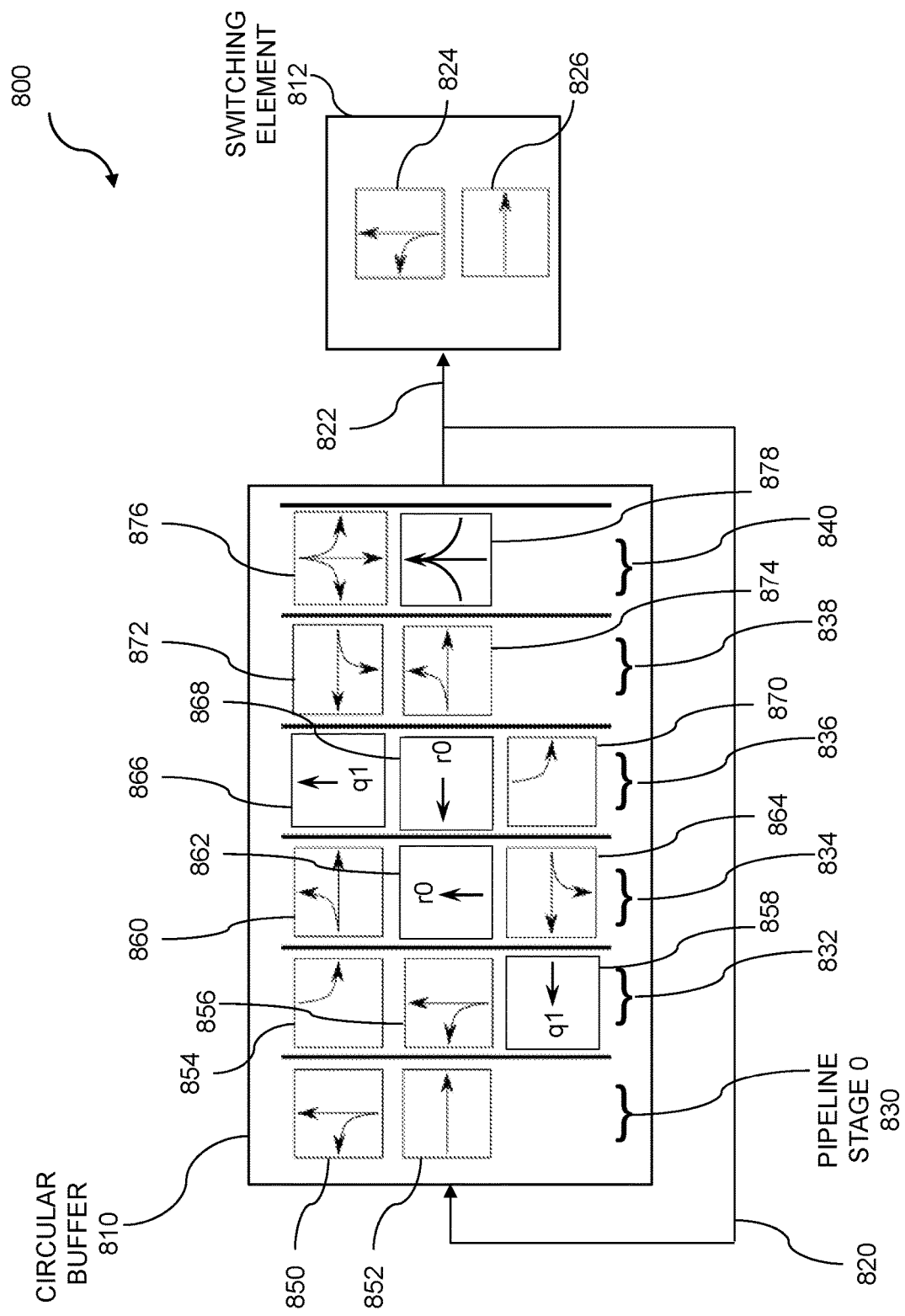
FIG. 8 illustrates a block diagram of a circular buffer.

FIG. 8 is a block diagram 800 of a circular buffer 810 and a corresponding switching element 812. Data can be obtained from a first switching unit, where the first switching unit can be controlled by a first circular buffer. Data can be sent to a second switching element, where the second switching element can be controlled by a second circular buffer. The obtaining data from the first switching element and the sending data to the second switching element can include a direct memory access (DMA). The block diagram 800 describes a processor-implemented method for data manipulation. The circular buffer 810 contains a plurality of pipeline stages. Each pipeline stage contains one or more instructions, up to a maximum instruction depth. In the embodiment shown in FIG. 8, the circular buffer 810 is a 6×3 circular buffer, meaning that it implements a six-stage pipeline with an instruction depth of up to three instructions per stage (column). Hence, the circular buffer 810 can include one, two, or three switch instruction entries per column. In some embodiments, the plurality of switch instructions per cycle can comprise two or three switch instructions per cycle. However, in certain embodiments, the circular buffer 810 supports only a single switch instruction in a given cycle. In the example 800 shown, Pipeline Stage 0 830 has an instruction depth of two instructions 850 and 852. Though the remaining pipeline stages 1-5 are not textually labeled in the FIG. 800, the stages are indicated by callouts 832, 834, 836, 838 and 840. Pipeline stage 1 832 has an instruction depth of three instructions 854, 856, and 858. Pipeline stage 2 834 has an instruction depth of three instructions 860, 862, and 864. Pipeline stage 3 836 also has an instruction depth of three instructions 866, 868, and 870. Pipeline stage 4 838 has an instruction depth of two instructions 872 and 874. Pipeline stage 5 840 has an instruction depth of two instructions 876 and 878. In embodiments, the circular buffer 810 includes 64 columns. During operation, the circular buffer 810 rotates through configuration instructions. The circular buffer 810 can dynamically change operation of the logical elements based on the rotation of the circular buffer. The circular buffer 810 can comprise a plurality of switch instructions per cycle for the configurable connections.

The instruction 852 is an example of a switch instruction. In embodiments, each cluster has four inputs and four outputs, each designated within the cluster's nomenclature moving clockwise as "north," "east," "south," and "west" respectively. For example, the instruction 852 in the diagram 800 is a west-to-east transfer instruction. The instruction 852 directs the cluster to take data on its west input and send out the data on its east output. In another example of data routing, the instruction 850 is a fan-out instruction. The instruction 850 instructs the cluster to take data from its south input and send out on the data through both its north output and its west output. The arrows within each instruction box indicate the source and destination of the data. The instruction 878 is an example of a fan-in instruction. The instruction 878 takes data from the west, south, and east inputs and sends out the data on the north output. Therefore, the configurable connections can be considered to be time multiplexed.

In embodiments, the clusters implement multiple storage elements in the form of registers. In the example 800 shown, the instruction 862 is a local storage instruction. The instruction 862 takes data from the instruction's south input and stores it in a register (r0). Another instruction (not shown) is a retrieval instruction. The retrieval instruction takes data from a register (e.g. r0) and outputs it from the instruction's output (north, south, east, west). Some embodiments utilize four general purpose registers, referred to as registers r0, r1, r2, and r3. The registers are, in embodiments, storage elements which store data while the configurable connections are busy with other data. In embodiments, the storage elements are 32-bit registers. In other embodiments, the storage elements are 64-bit registers. Other register widths are possible.

In embodiments, one or more switching elements of one or more clusters of switching elements can be placed into a sleep state. A switching element can enter a sleep state based on processing an instruction that places the switching element into the sleep state. The switching element can be woken from the sleep state as a result of valid data being presented to the switching element of a cluster. Recall that a given switching element can be controlled by a circular buffer. The circular buffer can contain an instruction to place one or more of the switching elements into a sleep state. The circular buffer can remain awake while the switching element controlled by the circular buffer is in a sleep state. In embodiments, the circular buffer associated with the switching element can be placed into the sleep state along with the switching element. The circular buffer can wake along with its associated switching element. The circular buffer can wake at the same address in which it was located when the circular buffer was placed into the sleep state, at an address that can continue to increment while the circular buffer was in the sleep state, etc. The circular buffer associated with the switching element can continue to cycle while the switching element is in the sleep state, but instructions from the circular buffer may not be executed. The sleep state can include a rapid transition to sleep state capability, where the sleep state capability can be accomplished by limiting clocking to portions of the switching elements. In embodiments, the sleep state can include a slow transition to sleep state capability, where the slow transition to sleep state capability can be accomplished by powering down portions of the switching elements. The sleep state can include a low power state.

The obtaining the data from a first switching element and the sending the data to a second switching element can include a direct memory access (DMA). A DMA transfer can continue while valid data is available for the transfer. A DMA transfer can terminate when it has completed without error, or when an error occurs during operation. Typically, a cluster that initiates a DMA transfer will request to be brought out of sleep state when the transfer is completed. This waking process is achieved by setting control signals that can control the one or more switching elements. Once the DMA transfer is initiated with a start instruction, a processing element or switching element in the cluster can execute a sleep instruction to place itself to sleep. When the DMA transfer terminates, the processing elements and/or switching elements in the cluster can be brought out of sleep after the final instruction is executed. Note that if a control bit can be set in the register of the cluster that is operating as a slave in the transfer, that cluster can also be brought out of sleep state if it is asleep during the transfer.

The cluster that is involved in a DMA and can be brought out of sleep after the DMA terminates can determine that it has been brought out of a sleep state based on the code that is executed. A cluster can be brought out of a sleep state based on the arrival of a reset signal and the execution of a reset instruction. The cluster can be brought out of sleep by the arrival of valid data (or control) following the execution of a switch instruction. A processing element or switching element can determine why it was brought out of a sleep state by the context of the code that the element starts to execute. A cluster can be awoken during a DMA operation by the arrival of valid data. The DMA instruction can be executed while the cluster remains asleep and awaits the arrival of valid data. Upon arrival of the valid data, the cluster is woken and the data stored. Accesses to one or more data random access memories (RAM) can be performed when the processing elements and the switching elements are operating. The accesses to the data RAMs can also be performed while the processing elements and/or switching elements are in a low power sleep state.

In embodiments, the clusters implement multiple processing elements in the form of processor cores, referred to as cores q0, q1, q2, and q3. In embodiments, four cores are used, though any number of cores can be implemented. The instruction 858 is a processing instruction. The instruction 858 takes data from the instruction's east input and sends it to a processor q1 for processing. The processors can perform logic operations on the data, including, but not limited to, a shift operation, a logical AND operation, a logical OR operation, a logical NOR operation, a logical XOR operation, an addition, a subtraction, a multiplication, and a division. Thus, the configurable connections can comprise one or more of a fan-in, a fan-out, and a local storage.

In the example 800 shown, the circular buffer 810 rotates instructions in each pipeline stage into switching element 812 via a forward data path 822, and also back to a pipeline stage 0 830 via a feedback data path 820. Instructions can include switching instructions, storage instructions, and processing instructions, among others. The feedback data path 820 can allow instructions within the switching element 812 to be transferred back to the circular buffer. Hence, the instructions 824 and 826 in the switching element 812 can also be transferred back to pipeline stage 0 830 as the instructions 850 and 852. In addition to the instructions depicted on FIG. 8, a no-op instruction or a sleep instruction can also be inserted into a pipeline stage. In embodiments, a no-op instruction causes execution to not be performed for a given cycle. In effect, the introduction of a no-op instruction can cause a column within the circular buffer 810 to be skipped in a cycle. In contrast, not skipping an operation indicates that a valid instruction is being pointed to in the circular buffer. A sleep state can be accomplished by not applying a clock to a circuit, performing no processing within a processor, removing a power supply voltage or bringing a power supply to ground, storing information into a non-volatile memory for future use and then removing power applied to the memory, or by similar techniques. A sleep instruction that causes no execution to be performed until a predetermined event occurs which causes the logical element to exit the sleep state can also be explicitly specified. The predetermined event can be the arrival or availability of valid data. The data can be determined to be valid using Null Convention Logic (NCL). In embodiments, only valid data can flow through the switching elements and invalid data points (Xs) are not propagated by instructions.

In some embodiments, the sleep state is exited based on an instruction applied to a switching fabric. The sleep state can, in some embodiments, only be exited by stimulus external to the logical element and not based on the programming of the logical element. The external stimulus can include an input signal, which in turn can cause a wake up or an interrupt service request to execute on one or more of the logical elements. An example of such a wake-up request can be seen in the instruction 858, assuming that the processor q1 was previously in a sleep state. In embodiments, when the instruction 858 takes valid data from the east input and applies that data to the processor q1, the processor q1 wakes up and operates on the received data. In the event that the data is not valid, the processor q1 can remain in a sleep state. At a later time, data can be retrieved from the q1 processor, e.g. by using an instruction such as the instruction 866. In the case of the instruction 866, data from the processor q1 is moved to the north output. In some embodiments, if Xs have been placed into the processor q1, such as during the instruction 858, then Xs would be retrieved from the processor q1 during the execution of the instruction 866 and applied to the north output of the instruction 866.

A collision occurs if multiple instructions route data to a particular port in a given pipeline stage. For example, if instructions 852 and 854 are in the same pipeline stage, they will both send data to the east output at the same time, thus causing a collision since neither instruction is part of a time-multiplexed fan-in instruction (such as the instruction 878). To avoid potential collisions, certain embodiments use preprocessing, such as by a compiler, to arrange the instructions in such a way that there are no collisions when the instructions are loaded into the circular buffer. Thus, the circular buffer 810 can be statically scheduled in order to prevent data collisions. Thus, in embodiments, the circular buffers are statically scheduled. In embodiments, when the preprocessor detects a data collision, the scheduler changes the order of the instructions to prevent the collision. Alternatively or additionally, the preprocessor can insert further instructions such as storage instructions (e.g. the instruction 862), sleep instructions, or no-op instructions, to prevent the collision. Alternatively or additionally, the preprocessor can replace multiple instructions with a single fan-in instruction. For example, if a first instruction sends data from the south input to the north output and a second instruction sends data from the west input to the north output in the same pipeline stage, the first and second instruction can be replaced with a fan-in instruction that routes the data from both of those inputs to the north output in a deterministic way to avoid a data collision. In this case, the machine can guarantee that valid data is only applied on one of the inputs for the fan-in instruction.

Returning to DMA, a channel configured as a DMA channel requires a flow control mechanism that is different from regular data channels. A DMA controller can be included in interfaces to master DMA transfer through the processing elements and switching elements. For example, if a read request is made to a channel configured as DMA, the read transfer is mastered by the DMA controller in the interface. It includes a credit count that keeps track of the number of records in a transmit (Tx) FIFO that are known to be available. The credit count is initialized based on the size of the Tx FIFO. When a data record is removed from the Tx FIFO, the credit count is increased. If the credit count is positive, and the DMA transfer is not complete, an empty data record can be inserted into a receive (Rx) FIFO. The memory bit is set to indicate that the data record should be populated with data by the source cluster. If the credit count is zero (meaning the Tx FIFO is full), no records are entered into the Rx FIFO. The FIFO to fabric block will make sure the memory bit is reset to 0, which thereby prevents a microDMA controller in the source cluster from sending more data.

Each slave interface manages four interfaces between the FIFOs and the fabric. Each interface can contain up to 15 data channels. Therefore, a slave should manage read/write queues for up to 60 channels. Each channel can be programmed to be a DMA channel, or a streaming data channel. DMA channels are managed using a DMA protocol. Streaming data channels are expected to maintain their own form of flow control using the status of the Rx FIFOs (obtained using a query mechanism). Read requests to slave interfaces use one of the flow control mechanisms described previously.

Figure 9:
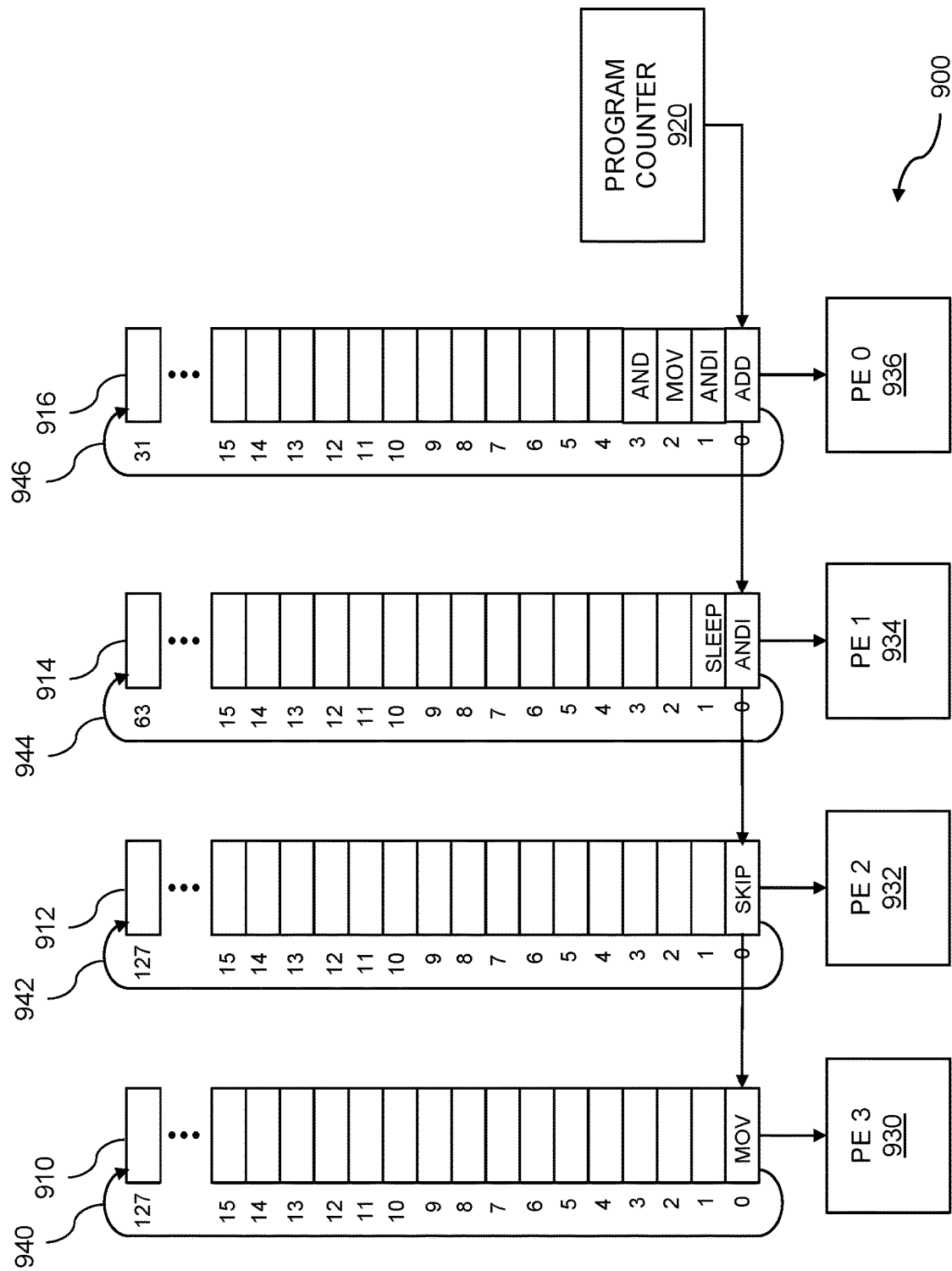
FIG. 9 illustrates a circular buffer and processing elements.

FIG. 9 shows example circular buffers and processing elements. This figure shows a diagram 900 indicating example instruction execution for processing elements. A circular buffer 910 feeds a processing element (PE) 930. A second circular buffer 912 feeds another processing element 932. A third circular buffer 914 feeds another processing element 934. A fourth circular buffer 916 feeds another processing element 936. The four processing elements 930, 932, 934, and 936 can represent a quad of processing elements. In embodiments, the processing elements 930, 932, 934, and 936 are controlled by instructions received from the circular buffers 910, 912, 914, and 916. The circular buffers can be implemented using feedback paths 940, 942, 944, and 946, respectively. In embodiments, the circular buffer can control the passing of data to a quad of processing elements through switching elements, where each of the quad of processing elements is controlled by four other circular buffers (as shown in the circular buffers 910, 912, 914, and 916) and where data is passed back through the switching elements from the quad of processing elements where the switching elements are again controlled by the main circular buffer. In embodiments, a program counter 920 is configured to point to the current instruction within a circular buffer. In embodiments with a configured program counter, the contents of the circular buffer are not shifted or copied to new locations on each instruction cycle. Rather, the program counter 920 is incremented in each cycle to point to a new location in the circular buffer. The circular buffers 910, 912, 914, and 916 can contain instructions for the processing elements. The instructions can include, but are not limited to, move instructions, skip instructions, logical AND instructions, logical AND-Invert (i.e. ANDI) instructions, logical OR instructions, mathematical ADD instructions, shift instructions, sleep instructions, and so on. A sleep instruction can be usefully employed in numerous situations. The sleep state can be entered by an instruction within one of the processing elements. One or more of the processing elements can be in a sleep state at any given time. In some embodiments, a "skip" can be performed on an instruction, the instruction in the circular buffer can be ignored, and the corresponding operation is therefore not performed.

The plurality of circular buffers can have differing lengths. That is, the plurality of circular buffers can comprise circular buffers of differing sizes. In embodiments, the circular buffers 910 and 912 have a length of 128 instructions, the circular buffer 914 has a length of 64 instructions, and the circular buffer 916 has a length of 32 instructions, but other circular buffer lengths are also possible, and in some embodiments, all buffers have the same length. The plurality of circular buffers that have differing lengths can resynchronize with a zeroth pipeline stage for each of the plurality of circular buffers. The circular buffers of differing sizes can restart at a same time step. In other embodiments, the plurality of circular buffers includes a first circular buffer repeating at one frequency and a second circular buffer repeating at a second frequency. In this situation, the first circular buffer is of one length. When the first circular buffer finishes through a loop, it can restart operation at the beginning, even though the second, longer circular buffer has not yet completed its operations. When the second circular buffer reaches completion of its loop of operations, the second circular buffer can restart operations from its beginning.

As can be seen in FIG. 9, different circular buffers can have different instruction sets within them. For example, circular buffer 910 contains a MOV instruction. Circular buffer 912 contains a SKIP instruction. Circular buffer 914 contains a SLEEP instruction and an ANDI instruction. Circular buffer 916 contains an AND instruction, a MOVE instruction, an ANDI instruction, and an ADD instruction.

The operations performed by the processing elements 930, 932, 934, and 936 are dynamic and can change over time based on the instructions loaded into the respective circular buffers. As the circular buffers rotate, new instructions can be executed by the respective processing element.

Figure 10:
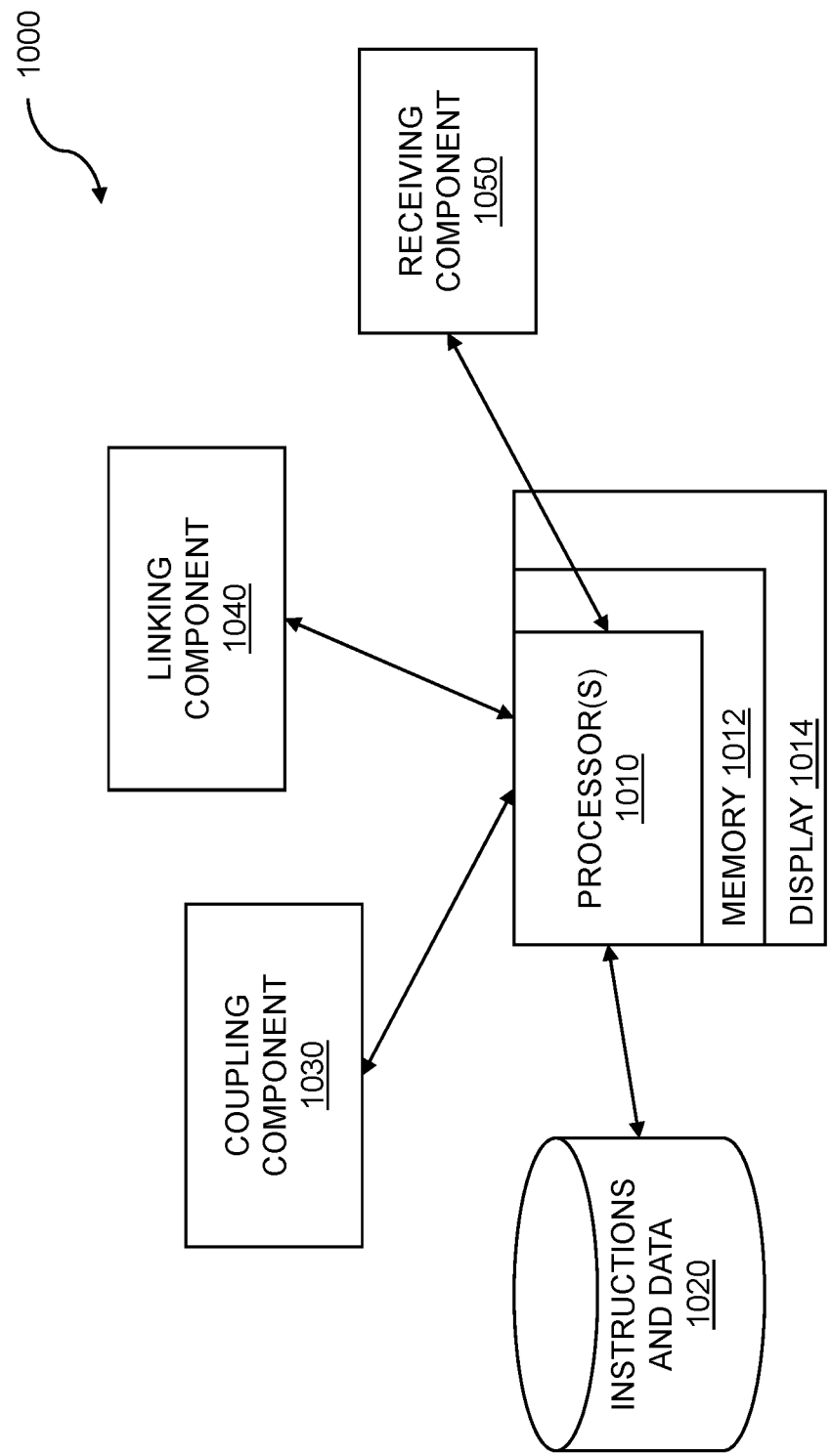
FIG. 10 is a system diagram for joining data within a reconfigurable fabric.

FIG. 10 is a system diagram for joining data within a reconfigurable fabric. The system 1000 can include one or more processors 1010 coupled to a memory 1012 which stores instructions. The system 1000 can include a display 1014 coupled to the one or more processors 1010 for displaying data, intermediate steps, instructions, and so on. In embodiments, one or more processors 1010 are attached to the memory 1012 where the one or more processors, when executing the instructions which are stored, are configured to: couple a plurality of control agents, executing on a plurality of processing elements, wherein the plurality of processing elements comprises a reconfigurable fabric and wherein the plurality of processing elements is controlled by circular buffers; link a first control agent and a second control agent, from the plurality of control agents, with a third control agent, from the plurality of control agents; and receive data from the first control agent and the second control agent by the third control agent, wherein a first FIFO memory is employed by the first control agent to facilitate the receiving of the data by the third control agent, and a second FIFO memory is employed by the second control agent to facilitate the receiving of the data by the third control agent.

The system 1000 can include a collection of instructions and data 1020. The instructions and data 1020 may be stored in a database, one or more statically linked libraries, one or more dynamically linked libraries, precompiled headers, source code, flow graphs, or other suitable formats. The instructions can include instructions for joining data from one or more upstream processing elements in a reconfigurable fabric. The system 1000 can include a coupling component 1030. The coupling component can include functions and instructions for coupling control agents. This can include instructions for routing data between and among control agents within a reconfigurable fabric. The system 1000 can include a linking component 1040. The linking component 1040 can include functions and instructions for linking a computing system comprising multiple processing elements that support join operations. The linking can include establishing a mesh size, and/or establishing an initial placement of process agents.

The system 1000 can include a receiving component 1050. The receiving component 1050 can include functions and instructions for receiving data from multiple upstream processing elements, and computing a result that is a function of the received data. The receiving component 1050 can include instructions to determine validity of data in FIFOs supplied by upstream processing elements, and activate an operation once two or more FIFOs indicate that valid data is available.

The system 1000 can include computer program product embodied in a non-transitory computer readable medium for data manipulation, the computer program product comprising code which causes one or more processors to perform operations of: coupling a plurality of control agents, executing on a plurality of processing elements, wherein the plurality of processing elements comprises a reconfigurable fabric and wherein the plurality of processing elements is controlled by circular buffers; linking a first control agent and a second control agent, from the plurality of control agents, with a third control agent, from the plurality of control agents; and receiving data from the first control agent and the second control agent by the third control agent, wherein a first FIFO memory is employed by the first control agent to facilitate the receiving of the data by the third control agent, and a second FIFO memory is employed by the second control agent to facilitate the receiving of the data by the third control agent.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for data manipulation comprising:

coupling a plurality of control agents, executing on a plurality of processing elements, wherein the plurality of processing elements comprises a reconfigurable fabric and wherein the plurality of processing elements is controlled by circular buffers;

linking a first control agent and a second control agent, from the plurality of control agents, with a third control agent, from the plurality of control agents; and receiving data from the first control agent and the second control agent by the third control agent, wherein a first FIFO memory is employed by the first control agent to facilitate the receiving of the data by the third control agent, a second FIFO memory is employed by the second control agent to facilitate the receiving of the data by the third control agent, and the receiving the data from the first control agent and the data from the second control agent comprises joining data.

2. The method of claim 1 further comprising operating on the data, received from the first control agent and the second control agent, by the third control agent.

3. The method of claim 2 further comprising producing resulting data based on the operating on the data.

4. The method of claim 3 further comprising sending the resulting data to a fourth control agent from the plurality of control agents.

5. The method of claim 4 wherein the receiving of the data by the third control agent is only accomplished when there is output space available for results from the third control agent.

6. The method of claim 5 wherein the receiving of the data by the third control agent comprises consuming the data.

7. The method of claim 5 wherein output space is available in a third FIFO employed between the third control agent and the fourth control agent.

8. The method of claim 5 wherein processing by the third control agent is delayed until output space is available.

9. The method of claim 8 wherein the processing by the third control agent is suspended by stopping rotating of a circular buffer within the circular buffers.

10. The method of claim 2 wherein the operating on the data is in response to receiving the data from the first control agent and the second control agent.

11. The method of claim 10 wherein the data received from the first control agent is determined to be valid.

12. The method of claim 11 wherein the data received from the second control agent is determined to be valid.

13. The method of claim 11 wherein the operating is based on the data being valid.

14. The method of claim 13 wherein the operating is activated by the data being valid.

15. The method of claim 11 wherein a processing element associated with the third control agent is brought out of a sleep state when the data from the first control agent is determined to be valid.

16. The method of claim 11 wherein a processing element associated with the third control agent is brought out of a sleep state by the data from the first control agent being valid.

17. The method of claim 16 wherein the third control agent is brought out of a sleep state by the data from the second control agent also being valid.

18. The method of claim 1 wherein the joining data is accomplished by the third control agent.

19. The method of claim 1 further comprising sending a fire signal from the first control agent to the third control agent to facilitate operating by the third control agent.

20. The method of claim 1 further comprising linking a fifth control agent, from the plurality of control agents, with the third control agent.

21. The method of claim 20 further comprising receiving data from the fifth control agent by the third control agent.

22. The method of claim 21 wherein a third FIFO memory is interposed between the fifth control agent and the third control agent.

23. The method of claim 22 wherein the third FIFO memory facilitates the receiving of the data by the third control agent.

24. A computer program product embodied in a non-transitory computer readable medium for data manipulation, the computer program product comprising code which causes one or more processors to perform operations of:
  coupling a plurality of control agents, executing on a plurality of processing elements, wherein the plurality of processing elements comprises a reconfigurable fabric and wherein the plurality of processing elements is controlled by circular buffers;
  linking a first control agent and a second control agent, from the plurality of control agents, with a third control agent, from the plurality of control agents; and
  receiving data from the first control agent and the second control agent by the third control agent, wherein a first FIFO memory is employed by the first control agent to facilitate the receiving of the data by the third control agent, a second FIFO memory is employed by the second control agent to facilitate the receiving of the data by the third control agent, and the receiving the data from the first control agent and the data from the second control agent comprises joining data.

25. A computer system for analysis comprising:
  a memory which stores instructions;
  one or more processors attached to the memory wherein the one or more processors, when executing the instructions which are stored, are configured to:
    couple a plurality of control agents, executing on a plurality of processing elements, wherein the plurality of processing elements comprises a reconfigurable fabric and wherein the plurality of processing elements is controlled by circular buffers;
    link a first control agent and a second control agent, from the plurality of control agents, with a third control agent, from the plurality of control agents; and
    receive data from the first control agent and the second control agent by the third control agent, wherein a first FIFO memory is employed by the first control agent to facilitate the receiving of the data by the third control agent, a second FIFO memory is employed by the second control agent to facilitate the receiving of the data by the third control agent, and receiving the data from the first control agent and the data from the second control agent comprises joining data.

* * * * *